United States Patent
Iwafuchi et al.

(10) Patent No.: US 9,508,317 B2
(45) Date of Patent: Nov. 29, 2016

(54) DISPLAY EVALUATION DEVICE, DISPLAY EVALUATION METHOD, AND NON-TRANSITORY COMPUTER READABLE MEDIUM

(71) Applicant: FUJI XEROX CO., LTD., Tokyo (JP)

(72) Inventors: Toshihiro Iwafuchi, Kanagawa (JP); Kazuhiko Horikawa, Kanagawa (JP); Chizuru Osawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 88 days.

(21) Appl. No.: 14/524,437

(22) Filed: Oct. 27, 2014

(65) Prior Publication Data

US 2015/0356751 A1    Dec. 10, 2015

(30) Foreign Application Priority Data

Jun. 9, 2014   (JP) .................................. 2014-118735

(51) Int. Cl.
| | | |
|---|---|---|
| *G06T 11/00* | (2006.01) | |
| *G09G 5/02* | (2006.01) | |
| *H04N 21/485* | (2011.01) | |

(52) U.S. Cl.
CPC ............ *G09G 5/02* (2013.01); *H04N 21/4854* (2013.01); *G09G 2320/0693* (2013.01); *G09G 2340/06* (2013.01)

(58) Field of Classification Search
None
See application file for complete search history.

(56) References Cited

U.S. PATENT DOCUMENTS

| | | | |
|---|---|---|---|
| 2005/0277815 A1* | 12/2005 | Taniguchi | A61B 6/461 600/300 |
| 2007/0001710 A1* | 1/2007 | Park | G09G 3/3611 324/750.19 |
| 2011/0148902 A1* | 6/2011 | Haga | H04N 17/02 345/589 |
| 2011/0229662 A1* | 9/2011 | Kamee | B29C 41/24 428/1.3 |
| 2012/0026315 A1* | 2/2012 | Lee | G09G 3/006 348/92 |
| 2012/0154394 A1* | 6/2012 | Horikoshi | G09G 3/003 345/419 |
| 2014/0009505 A1* | 1/2014 | Moon | G09G 5/10 345/690 |

FOREIGN PATENT DOCUMENTS

| | | | | |
|---|---|---|---|---|
| EP | 1300939 A1 * | 4/2003 | | H03D 7/02 |
| JP | 2012-227703 A | 11/2012 | | |

* cited by examiner

*Primary Examiner* — Xiao Wu
*Assistant Examiner* — Yu Chen
(74) *Attorney, Agent, or Firm* — Oliff PLC

(57) ABSTRACT

Provided is a display evaluation device, including a specification unit that specifies a boundary gradation value as a boundary of whether or not a viewer identifies a color of an image displayed on a display device based on display characteristics of the display device, a first output unit that generates a viewing angle evaluation image using a boundary image having a gradation value close to the specified boundary gradation value and that outputs the viewing angle evaluation image to the display device, and an evaluation unit that specifies presence or absence of a difference in appearance of the viewing angle evaluation image when the viewing angle evaluation image is viewed from plural viewing angles and that evaluates the display characteristics of the display device due to a viewing angle difference.

20 Claims, 16 Drawing Sheets

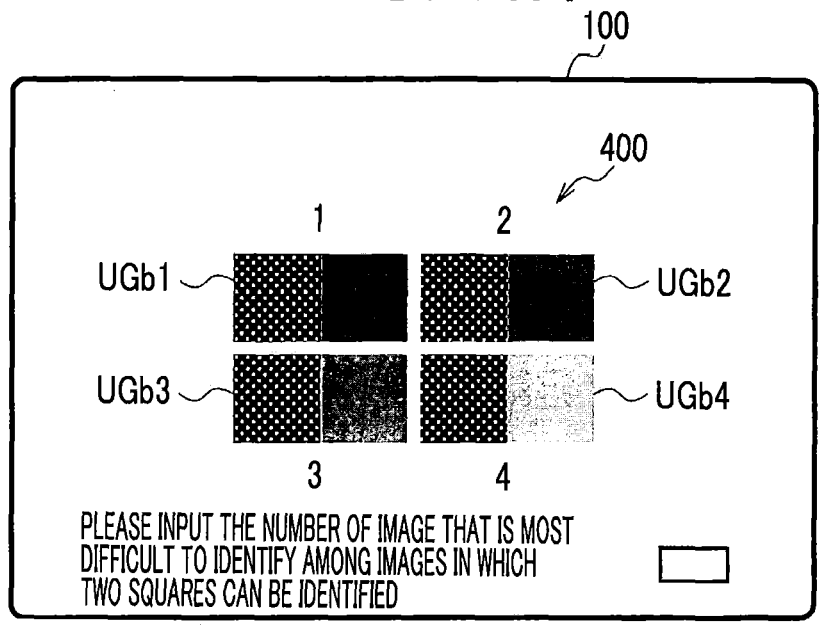
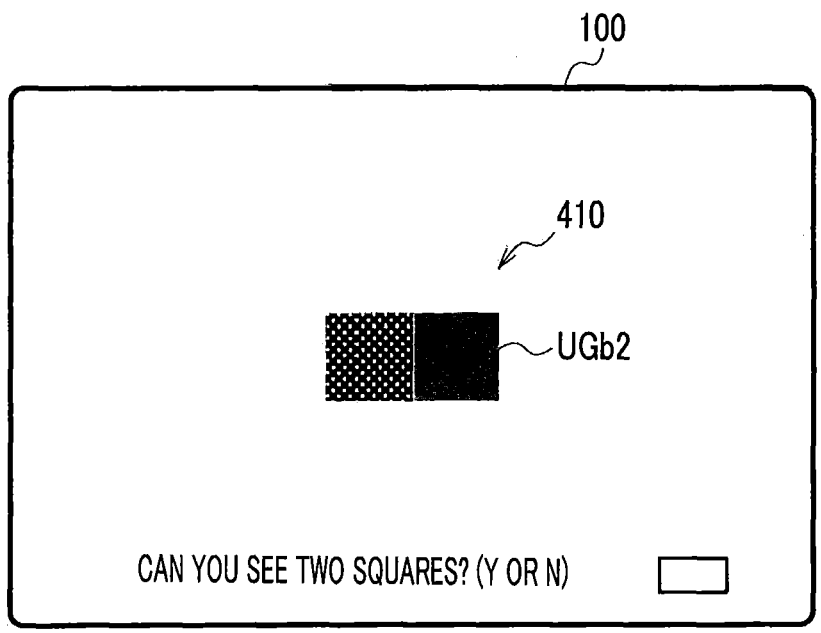

○ VIEWING ANGLE EVALUATION IMAGE

× MARKER

○ VIEWING ANGLE EVALUATION IMAGE

SUITABLE VIEWING REGION

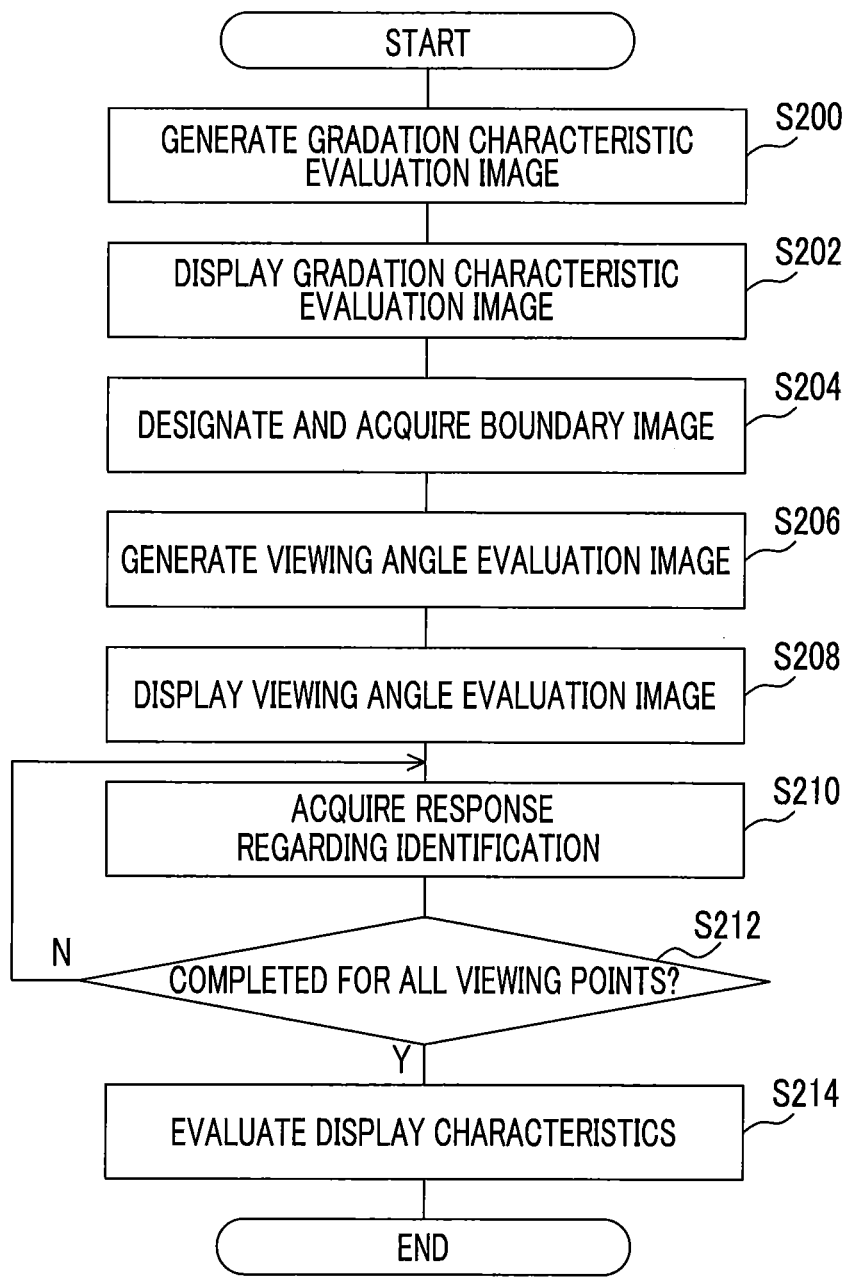

DISPLAY EVALUATION DEVICE, DISPLAY EVALUATION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-118735 filed Jun. 9, 2014.

BACKGROUND

Technical Field

The present invention relates to a display evaluation device, a display evaluation method, and a non-transitory computer readable medium.

SUMMARY

According to an aspect of the invention, there is provided a display evaluation device, including:

a specification unit that specifies a boundary gradation value as a boundary of whether or not a viewer identifies a color of an image displayed on a display device based on display characteristics of the display device;

a first output unit that generates a viewing angle evaluation image using a boundary image having a gradation value close to the specified boundary gradation value and that outputs the viewing angle evaluation image to the display device; and an evaluation unit that specifies presence or absence of a difference in appearance of the viewing angle evaluation image when the viewing angle evaluation image is viewed from plural viewing angles and that evaluates the display characteristics of the display device due to a viewing angle difference.

BRIEF DESCRIPTION OF THE DRAWINGS

Exemplary embodiments of the present invention will be described in detail based on the following figures, wherein:

FIGS. 11A and 11B are schematic diagrams illustrating examples of a gradation characteristic evaluation image and a viewing angle evaluation image generated by a display evaluation device according to a third exemplary embodiment;

FIG. 16 is a flowchart illustrating the process flow of a display evaluation program according to the fourth exemplary embodiment.

DETAILED DESCRIPTION

Hereinafter, exemplary embodiments of the invention will be described in detail with reference to the accompanying diagrams.

First Exemplary Embodiment

A display evaluation device according to the present exemplary embodiment is realized by operating an information processing apparatus, such as a personal computer that uses a display device, according to a program. In addition, when a display device has a function that operates according to a similar program, the display evaluation device may be realized by the display device alone.

Figure 1A:
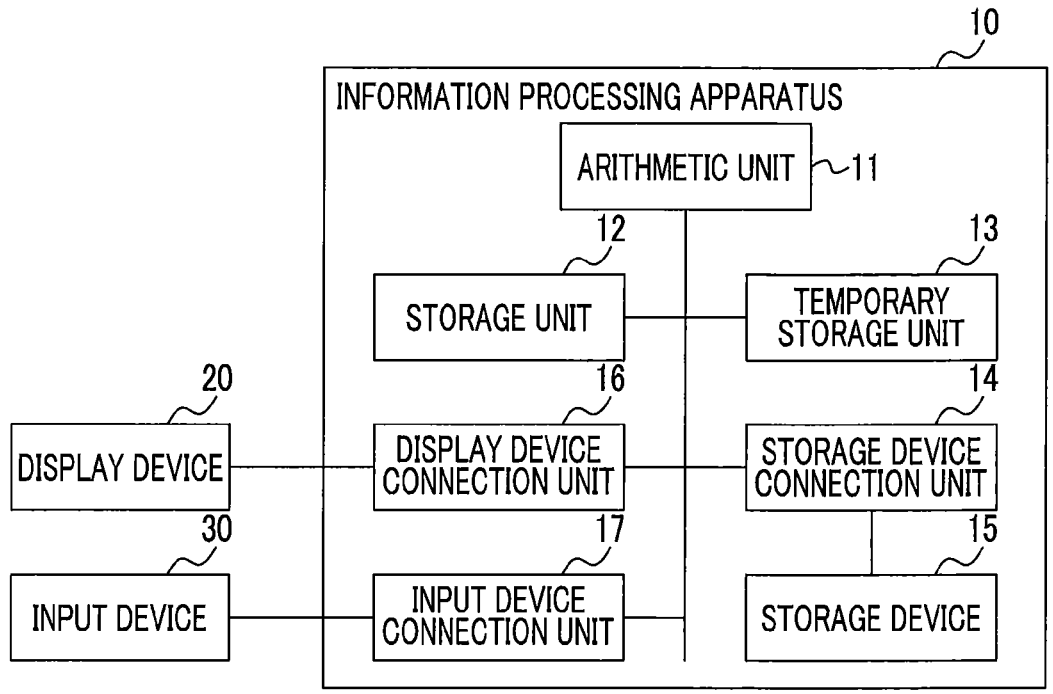
FIGS. 1A and 1B are block diagrams illustrating examples of the configuration of an information processing apparatus according to an exemplary embodiment.
Figure 1B:
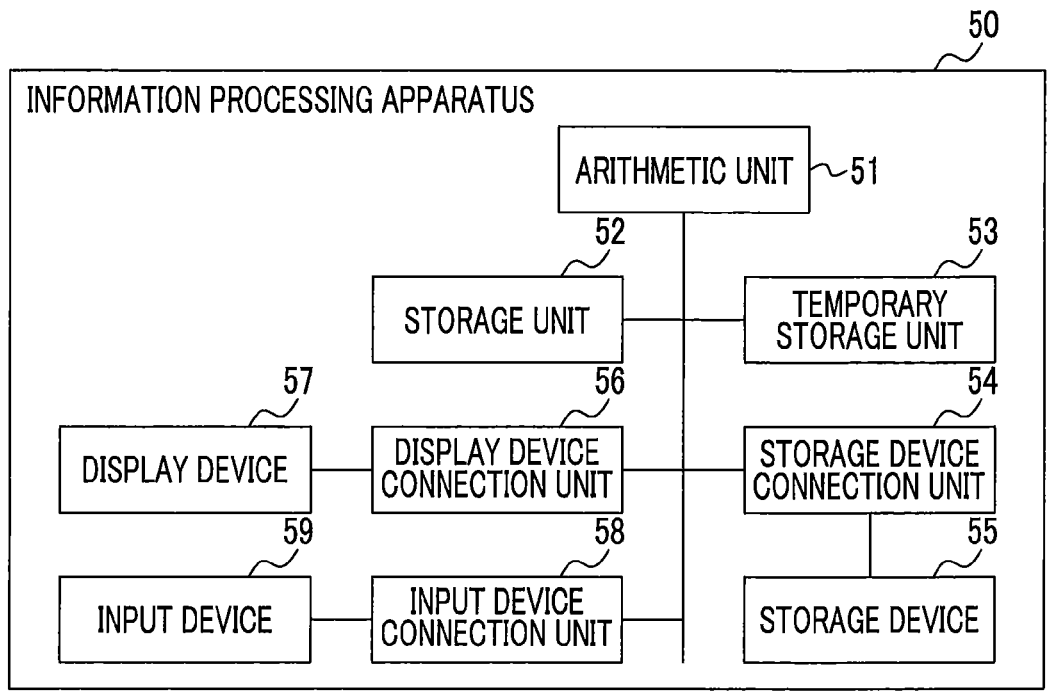

FIGS. 1A and 1B are block diagrams illustrating examples of the configuration of the information processing apparatus according to the present exemplary embodiment. FIG. 1A illustrates an information processing apparatus to which a display device is connected. For example, the information processing apparatus illustrated in FIG. 1A is a desktop personal computer. In addition, FIG. 1B illustrates an information processing apparatus that is formed integrally with a display device. For example, the information processing apparatus illustrated in FIG. 1B is a notebook personal computer.

As illustrated in FIG. 1A, an information processing apparatus 10 is configured to include an arithmetic unit 11, a storage unit 12, a temporary storage unit 13, a storage device connection unit 14, a storage device 15, a display device connection unit 16, and an input device connection unit 17.

The arithmetic unit 11 performs arithmetic processing, and is realized by a processor, such as a central processing unit (CPU), for example.

The storage unit 12 stores a program, setting information, or the like, and is realized by a semiconductor storage device, such as a read only memory (ROM) or a non-volatile memory, for example.

The temporary storage unit 13 is used as a working area or the like when the arithmetic unit 11 performs arithmetic processing, and temporarily stores information or the like. The temporary storage unit 13 is realized by a semiconductor memory device, such as a random access memory (RAM), for example.

The storage device connection unit 14 is an interface for connecting the storage device 15, and transmits and receives information or the like to and from the storage device 15 and controls the operation of the storage device 15. For example, the storage device connection unit 14 is realized by an integrated circuit including a processor.

The storage device 15 stores information or the like, and is realized by a magnetic disk or a semiconductor memory device.

The display device connection unit 16 is an interface for connecting a display device 20, and generates a signal for displaying a display screen on the display device 20. For example, the display device connection unit 16 is realized by an integrated circuit including a processor.

The input device connection unit 17 is an interface for connecting an input device 30 that is a pointing device such as a mouse, a keyboard, or the like, and acquires a signal corresponding to an instruction operation performed on the input device 30. For example, the input device connection unit 17 is realized by an integrated circuit including a processor.

In addition, although not illustrated in FIG. 1A, other components, such as a communication unit that operates as an interface with a network, may be included in the information processing apparatus 10.

In addition, as illustrated in FIG. 1B, an information processing apparatus 50 is configured to include an arithmetic unit 51, a storage unit 52, a temporary storage unit 53, a storage device connection unit 54, a storage device 55, a display device connection unit 56, a display device 57, an input device connection unit 58, and an input device 59.

The arithmetic unit 51 performs arithmetic processing, and is realized by a processor, such as a CPU, for example.

The storage unit 52 stores a program, setting information, or the like, and is realized by a semiconductor storage device, such as a ROM or a non-volatile memory, for example.

The temporary storage unit 53 is used as a working area or the like when the arithmetic unit 51 performs arithmetic processing, and temporarily stores information or the like. The temporary storage unit 13 is realized by a semiconductor memory device, such as a RAM, for example.

The storage device connection unit 54 is an interface for connecting the storage device 55, and transmits and receives information or the like to and from the storage device 55 and controls the operation of the storage device 55. For example, the storage device connection unit 54 is realized by an integrated circuit including a processor.

The storage device 55 stores information or the like, and is realized by a magnetic disk or a semiconductor memory device.

The display device connection unit 56 is an interface for connecting the display device 57, and generates a signal for displaying a display screen on the display device 57. For example, the display device connection unit 56 is realized by an integrated circuit including a processor.

The display device 57 displays a display screen according to the signal output from the display device connection unit 56, and liquid crystal is used, for example.

The input device connection unit 58 is an interface for connecting the input device 59, and acquires a signal corresponding to an instruction operation performed on the input device 59. For example, the input device connection unit 58 is realized by an integrated circuit including a processor.

The input device 59 is a pointing device such as a pad, a keyboard, or the like.

In addition, although not illustrated in FIG. 1B, other components, such as a communication unit that operates as an interface with a network, may be included in the information processing apparatus 50.

When a display evaluation device is realized using the information processing apparatus 10, the arithmetic unit 11 or the like is made to operate based on a program stored in the storage unit 12 or the storage device 15 of the information processing apparatus 10, a display screen for display evaluation process is displayed on the display device 20, and the display evaluation process is performed according to an input from the input device 30 to the display.

Similarly, when a display evaluation device is realized using the information processing apparatus 50, the arithmetic unit 51 or the like is made to operate based on a program stored in the storage unit 52 or the storage device 55 of the information processing apparatus 50, a display screen for display evaluation process is displayed on the display device 57, and the display evaluation process is performed according to an input from the input device 59 to the display.

In addition, although the example in which the program according to the present exemplary embodiment is stored in the storage device 15, the storage device 55, or the like has been described in the present exemplary embodiment, the invention is not limited thereto. For example, the program according to the present exemplary embodiment may be provided through an optical storage medium, such as a compact disk read only memory (CD-ROM), or other media, or may be provided through a network.

Figure 2:
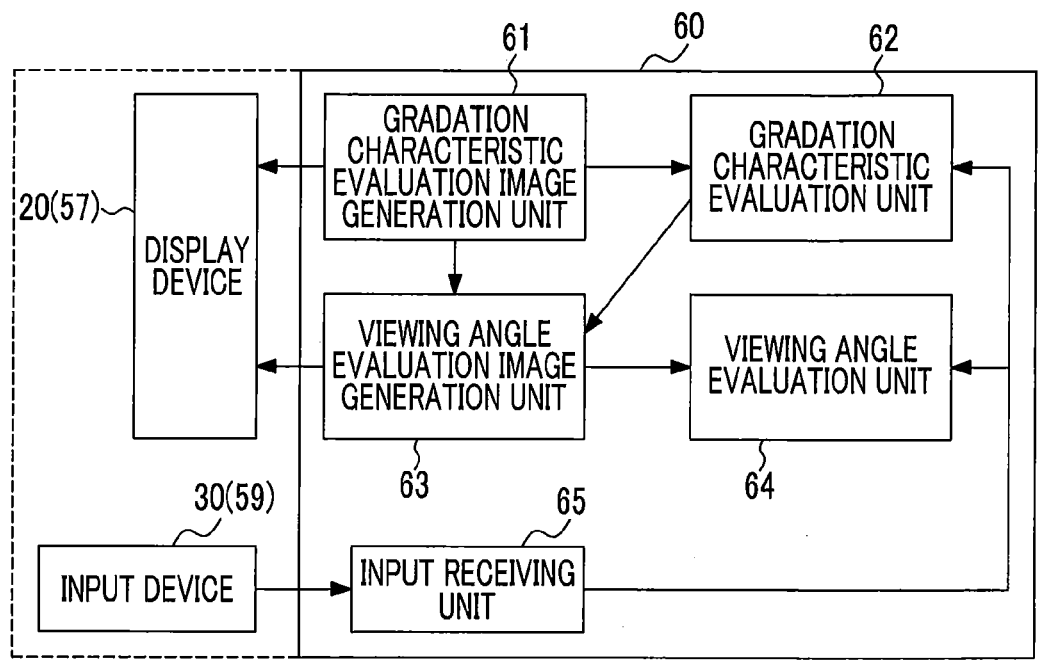
FIG. 2 is a block diagram illustrating an example of the configuration of a display evaluation device according to the exemplary embodiment.

Next, the functional configuration of the display evaluation device according to the present exemplary embodiment will be described. FIG. 2 is a diagram illustrating an example of the functional configuration of a display evaluation device 60 according to the present exemplary embodiment.

As illustrated in FIG. 2, the display evaluation device is configured to include a gradation characteristic evaluation image generation unit 61, a gradation characteristic evaluation unit 62, a viewing angle evaluation image generation unit 63, a viewing angle evaluation unit 64, and an input receiving unit 65. In addition, when the display evaluation device 60 is realized using the information processing apparatus 50, both the display device 57 and the input device 59 are a part of the display evaluation device 60 (indicated by the dashed line in FIG. 2).

The gradation characteristic evaluation image generation unit 61 generates image data from a gradation characteristic evaluation image used in the display evaluation process according to the present exemplary embodiment, and displays a display screen based on the generated image data on the display device 20 or the display device 57. In addition, the generated image data of the gradation characteristic evaluation image is supplied to the gradation characteristic evaluation unit 62. The details of the gradation characteristic evaluation image displayed on the display device 20 or the display device 57 will be described later.

The gradation characteristic evaluation unit 62 is a unit that performs the evaluation of the gradation characteristics of the display evaluation process according to the present exemplary embodiment based on the image data of the gradation characteristic evaluation image received from the gradation characteristic evaluation image generation unit 61 and the input of an instruction operation corresponding to the gradation characteristic evaluation image received by the input receiving unit 65.

The viewing angle evaluation image generation unit 63 generates image data from a viewing angle evaluation image used in the display evaluation process according to the present exemplary embodiment, and displays a display screen based on the generated image data on the display device 20 or the display device 57. In addition, the generated image data of the viewing angle evaluation image is supplied to the viewing angle evaluation unit 64. The details of the viewing angle evaluation image displayed on the display device 20 or the display device 57 will be described later.

The viewing angle evaluation unit 64 is a unit that performs viewing angle evaluation of the display evaluation process according to the present exemplary embodiment based on the image data of the viewing angle evaluation image received from the viewing angle evaluation image generation unit 63 and the input of an instruction operation corresponding to the viewing angle evaluation image received by the input receiving unit 65.

The input receiving unit 65 receives an input of an instruction operation by a viewer of the display device according to the display screen displayed on the display device 20 or the display device 57.

Figure 3A:
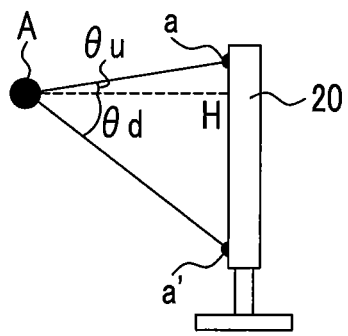
FIGS. 3A to 3C are diagrams for explaining the viewing angle according to the exemplary embodiment.

Here, a viewing angle when a viewer views the display screen of the display device 20 (57) will be described with reference to FIGS. 3A to 3C. Basically, the viewer tends to view the display screen displayed on the display device from the front side. However, a difference in the viewing angle occurs depending on the position of interest within the display screen. For example, in the case of the stationary display device 20 that is fixedly disposed on a desk, as illustrated in FIG. 3A, assuming that the viewing point of the viewer is a position of reference numeral A in the diagram, the viewing angle with respect to the display screen when viewing the position of reference numeral a that is an upper portion of the display screen is different from that when viewing the position of reference numeral a' that is a lower portion of the display screen.

In the present exemplary embodiment, when a normal line H is drawn toward the display device 20 from the point A, the viewing angle is defined as an angle θu of the straight line connecting the points A and a with respect to the normal line H and an angle θd of the straight line connecting the points A and a' with respect to the normal line H. In addition, an angle θu+θd may be called the viewing angle.

Figure 3B:
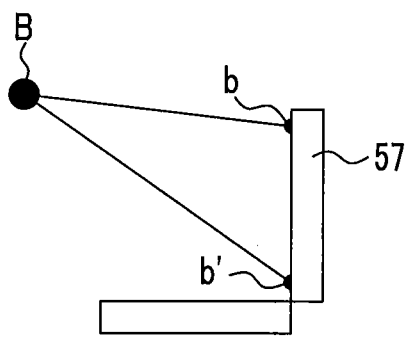

Similarly, in the case of the display device 57 of the information processing apparatus that is formed integrally with a display device, as illustrated in FIG. 3B, assuming that the viewing point of the viewer is a position of reference numeral B in the diagram, the viewing angle with respect to the display screen when viewing the position of reference numeral b that is an upper portion of the display screen is different from that when viewing the position of reference numeral b' that is a lower portion of the display screen.

Figure 3C:
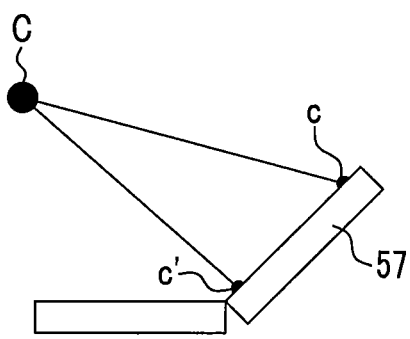

In addition, even when viewing the same display device 57, if a relative angle (degree of opening) between the display device 57 and the main body of the information processing apparatus 50 is different, as illustrated in FIG. 3C, assuming that the viewing point of the viewer is a position of reference numeral C in the diagram, the viewing angle with respect to the display screen when viewing the position of reference numeral c that is an upper portion of the display screen is different from that when viewing the position of reference numeral c' that is a lower portion of the display screen. This case is different from the case illustrated in FIG. 3B.

In addition, although the case where a difference in viewing angle occurs when viewing the upper and lower portions of the display screen has been described herein, the difference in viewing angle also occurs when viewing the left and right portions of the display screen.

Next, the display evaluation process performed by the display evaluation device according to the present exemplary embodiment will be described. First, the outline of the display evaluation process according to the present exemplary embodiment is as follows.

[1]: Plural gradation characteristic evaluation images are generated, and are displayed on the display screen of the display device 20 (57) in a direction in which the gradation is easily identified from a gradation characteristic evaluation image in which it is difficult to identify the gradation.

[2]: When a viewer views the gradation characteristic evaluation images displayed on the display screen from the position of the viewing angle 0° or the position of the viewing angle within a predetermined range from 0°, the viewer designates (replies) a gradation characteristic evaluation image of the gradation that is the most difficult for the viewer to identify, among the gradation characteristic evaluation images of the gradation that may be identified, through the input device 30 (59). Hereinbelow, viewing from the position of the viewing angle 0° or the position of the viewing angle within a predetermined range from 0° may be referred to as an "in front view", and the gradation characteristic evaluation image of the gradation that is the most difficult for the viewer to identify may be referred to as a "boundary image".

[3]: Based on the boundary image designated in [2], a viewing angle evaluation image is generated and displayed on the display screen. The viewing angle evaluation image according to the present exemplary embodiment may be generated using the boundary image itself, or may be generated by selecting a gradation characteristic evaluation image of the gradation value, which is close to the gradation value of the boundary image, from the plural gradation characteristic evaluation images. In the latter case, for example, a gradation characteristic evaluation image of the gradation before one step in a direction in which it is difficult to identify the gradation for the gradation of the boundary image is set as a viewing angle evaluation image. The viewing angle evaluation image selected in this manner is a gradation characteristic evaluation image whose gradation is not identified in front view by the viewer.

[4]: When the viewer views the viewing angle evaluation image displayed on the display screen from the viewing points of at least two different viewing angles, the viewer designates (replies) through the input device 30 (59) whether or not the viewing angle evaluation image is identified from each of the viewing points.

[5]: Based on the response acquired in [4], display evaluation of the display device 20 (57) is performed.

In addition, although the example in which a boundary image is specified by causing a viewer who views gradation characteristic evaluation images displayed on the display screen to designate a gradation characteristic evaluation image has been described in the present exemplary embodiment, the invention is not limited thereto. For example, a gradation value as a boundary of whether or not the viewer may identify the color of the image displayed on the display device (hereinafter, may be referred to as a "boundary gradation value") may be specified in advance, and a boundary image having a gradation value close thereto may be set, without being limited to designation by the viewer. Examples of the method of specifying the boundary gradation value in advance include a method of specifying the boundary gradation value by comparing the value of the color obtained by measuring an evaluation image using a colorimeter or the like with the value of the color that the viewer may generally identify, a method of specifying the boundary gradation value from the specification (for example, the type of liquid crystal or a polarizer used) for the display characteristics of the display device, and a method of specifying the boundary gradation value by simulation imitating the actual display device.

Figure 4A:
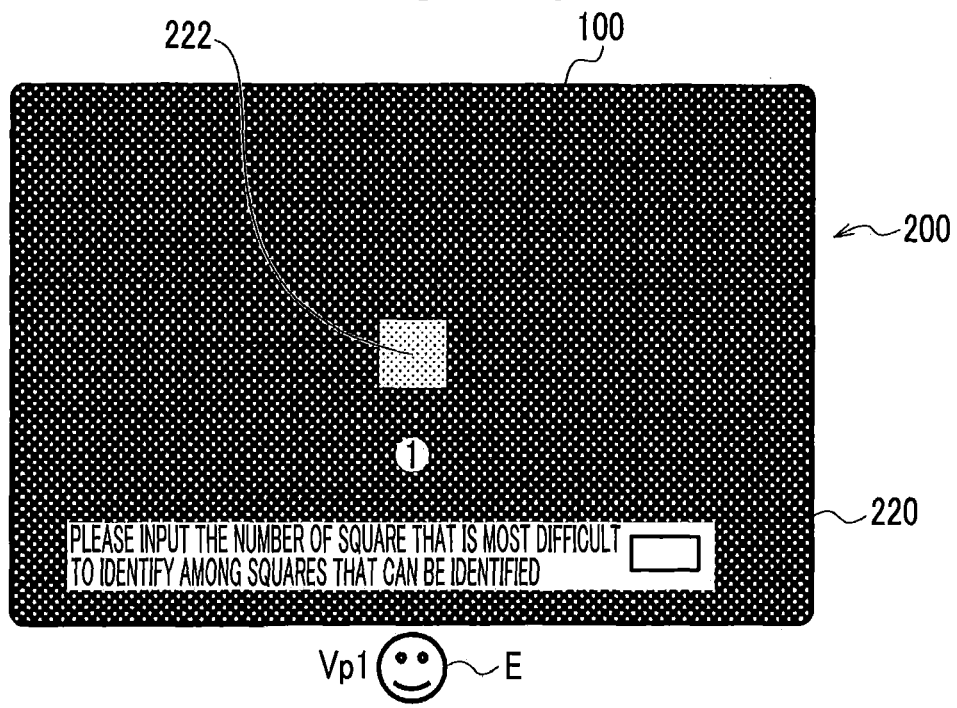
FIGS. 4A and 4B are schematic diagrams illustrating examples of a gradation characteristic evaluation image and a viewing angle evaluation image generated by a display evaluation device according to a first exemplary embodiment.
Figure 4B:
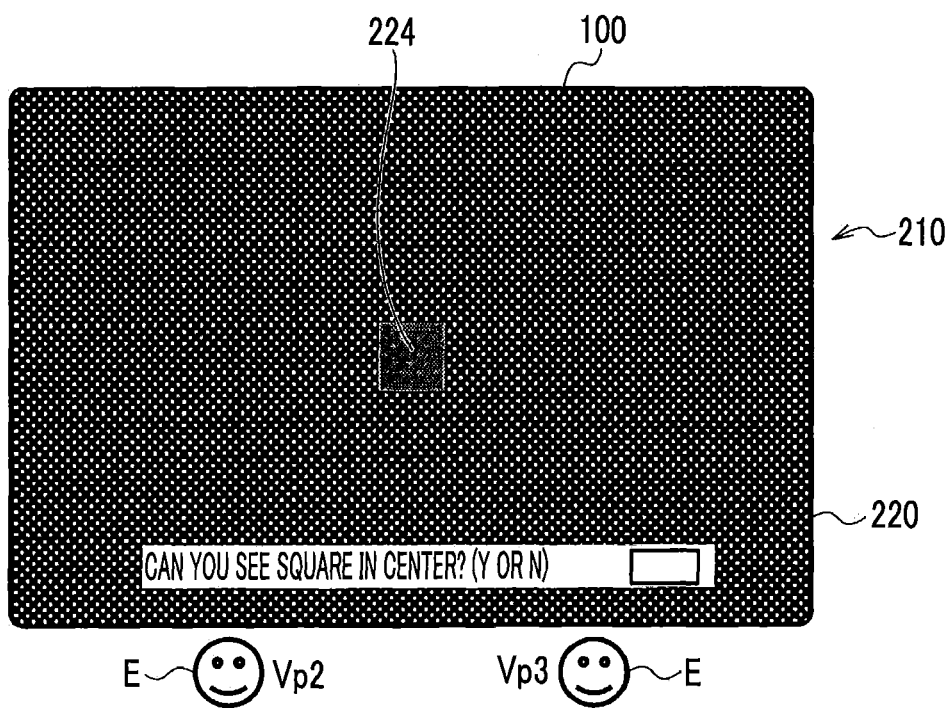

FIG. 4A illustrates an example of a gradation characteristic evaluation image 200 that is displayed on a display screen 100 and is generated by the gradation characteristic evaluation image generation unit 61 according to the present exemplary embodiment, and FIG. 4B illustrates an example of a viewing angle evaluation image 210 generated by the viewing angle evaluation image generation unit 63 according to the present exemplary embodiment.

Here, the gradation of color may be expressed by coordinates using the gradation value of the predetermined number of bits in the color space set in advance. In the present exemplary embodiment, as an example, a case where the gradation of color is expressed by coordinates (R, G, B) in the RGB color space illustrated in FIG. 6 will be described. In addition, the following explanation will be given by way of an example in which the number of bits expressing the gradation is 8 bits (256 gradations, and gradation values of 0 to 255).

Figure 6:
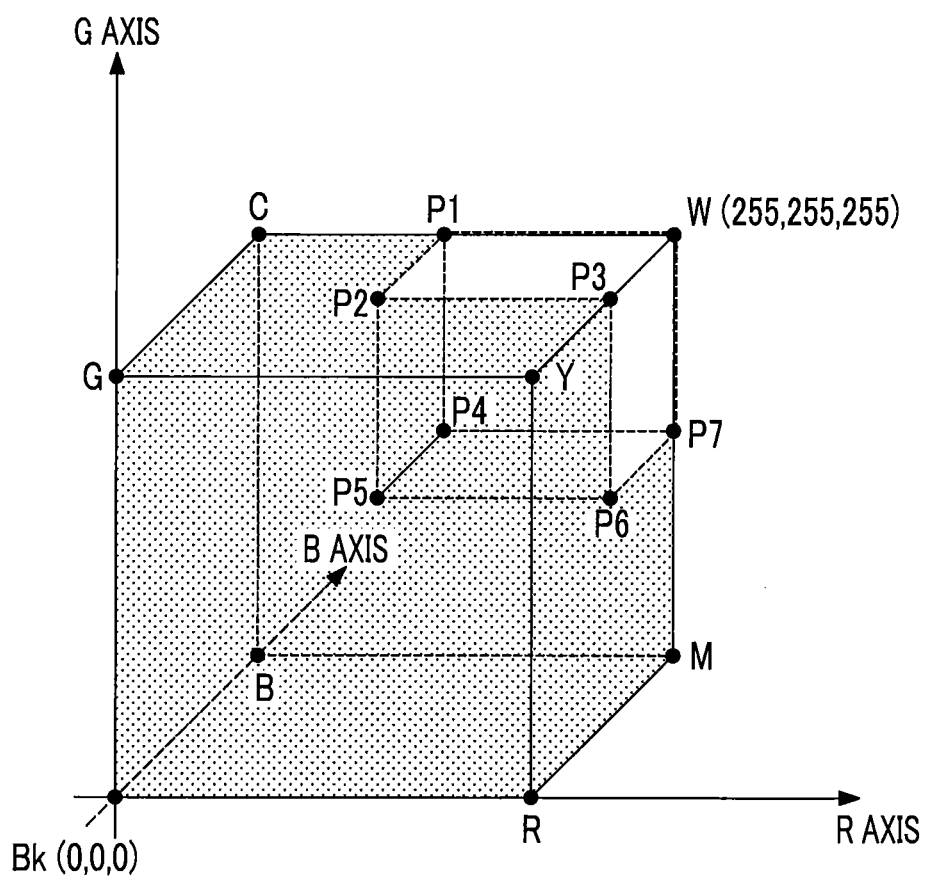
FIG. 6 is a diagram for explaining the selection of a reference color and an evaluation color of the gradation characteristic evaluation image and the viewing angle evaluation image according to the exemplary embodiment using the RGB color space.

As illustrated in FIG. 6, the RGB color space is an orthogonal coordinate system having R, G, and B axes. For example, in FIG. 6, the coordinates of black (Bk) are (0, 0, 0), the coordinates of red (R) are (255, 0, 0), the coordinates of green (G) are (0, 255, 0), the coordinates of blue (B) are (0, 0, 255), and the coordinates of white (W) are (255, 255, 255). In addition, the coordinates of yellow (Y), magenta (M), and cyan (C) that form other vertices of the cube illustrated in FIG. 6 are (255, 255, 0), (255, 0, 255), and (0, 255, 255), respectively.

As illustrated in FIG. 4A, the gradation characteristic evaluation image 200 is configured to include a reference image 220, which is an image of the reference color, and a first evaluation image 222, which is an image of the evaluation color. In the present exemplary embodiment, the "reference color" refers to a predetermined color as a reference when changing the gradation of the gradation characteristic evaluation image 200, and refers to a color having a gradation value set in advance. In addition, in the present exemplary embodiment, the "evaluation color" refers to a color for changing the gradation of the predetermined color when changing the gradation of the gradation characteristic evaluation image 200.

Here, the first evaluation image 222 is generated by setting the reference color of the reference image 220 to R(255, 0, 0) and determining the evaluation color as a gradation value RW(i) (255, a(i), a(i)) (0<a(i)<255, i is an integer of 1 to N) for changing the R while adding the R in a direction of W by N steps. That is, a change is made such that the viewer easily identifies the gradation by gradually increasing the relative gradation difference between the reference image 220 and the first evaluation image 222.

In this case, the gradation value R(255, 0, 0) of the reference image 220 is not changed, and remains the same. By combining the reference image 220 and the first evaluation image 222 as described above, the gradation characteristic evaluation image generation unit 61 generates image data of the gradation characteristic evaluation image 200 in which the relative gradations of the reference image 220 and the first evaluation image 222 are different, and displays the gradation characteristic evaluation image 200 on the display screen 100.

As illustrated in FIG. 4A, the gradation characteristic evaluation image 200 and a message "Please input the number of the square that is the most difficult to identify among squares that may be identified" are displayed on the display screen 100 together with an input box.

A viewer E who views the gradation characteristic evaluation image 200, which changes in a direction in which the relative gradation difference of the gradation characteristic evaluation image 200 increases gradually, from a viewing point Vp1 on the front side illustrated in FIG. 4A designates the gradation characteristic evaluation image 200, in which the first evaluation image 222 is the most difficult to identify, according to the above-described message through the input device 30 (59). In this case, the gradation value is set to RW(k) (255, a(k), a(k)). The gradation characteristic evaluation unit 62 that receives the designation of the gradation characteristic evaluation image 200 of the gradation value RW(k) through the input receiving unit 65 sets the gradation characteristic evaluation image 200 of the gradation value RW(k) as a boundary image, and stores the gradation characteristic evaluation image 200 in a storage section, such as the temporary storage unit 13 (53).

Then, as illustrated in FIG. 4B, the viewing angle evaluation image generation unit 63 generates the viewing angle evaluation image 210 including the reference image 220 and a second evaluation image 224 based on the gradation value RW(k) of the boundary image. In the present exemplary embodiment, the gradation value of the reference image 220 is set to R(255, 0, 0), and the gradation value of the second evaluation image 224 is set to RW(k) (255, a(k), a(k)), that is, to the gradation value of the first evaluation image 222 of the boundary image. The first evaluation image 222 of the gradation value RW(k) is the first evaluation image 222 that may be identified by the viewer.

As illustrated in FIG. 4B, the viewing angle evaluation image 210 and a message "Can you see square in center? (Y or N)" are displayed on the display screen 100 together with an input box.

According to the above-described message, the viewer E views the viewing angle evaluation image 210 from a viewing point of a viewing angle (viewing point at which the viewing angle is not 0°) that is different from the viewing point Vp1, and sends a response regarding whether or not the second evaluation image 224 is identified through the input device 30 (59). Although the number of viewing points of the viewer may be one, plural viewing points are preferable in terms of evaluation accuracy.

As illustrated in FIG. 4B, in the present exemplary embodiment, viewing points during the viewing angle evaluation are the two points of Vp2 and Vp3, as an example. Although the viewing points Vp2 and Vp3 are set in a horizontal direction with respect to the display screen 100 in FIG. 4B, the viewing points Vp2 and Vp3 may be set in a vertical direction with respect to the display screen 100.

In addition, the viewing point Vp1 in front view may be included in viewing points during the viewing angle evaluation.

Then, the viewing angle evaluation unit 64 that receives from the input receiving unit 65 a response regarding the identification of the second evaluation image 224 when viewed from the viewing points Vp2 and Vp3 performs determination as a poor viewing angle for the viewing point Vp corresponding to the response that the second evaluation image 224 is not identified and as a good viewing angle for the viewing point Vp corresponding to the response that the second evaluation image 224 may be identified, thereby performing viewing angle evaluation for each viewing point.

Figure 5A:
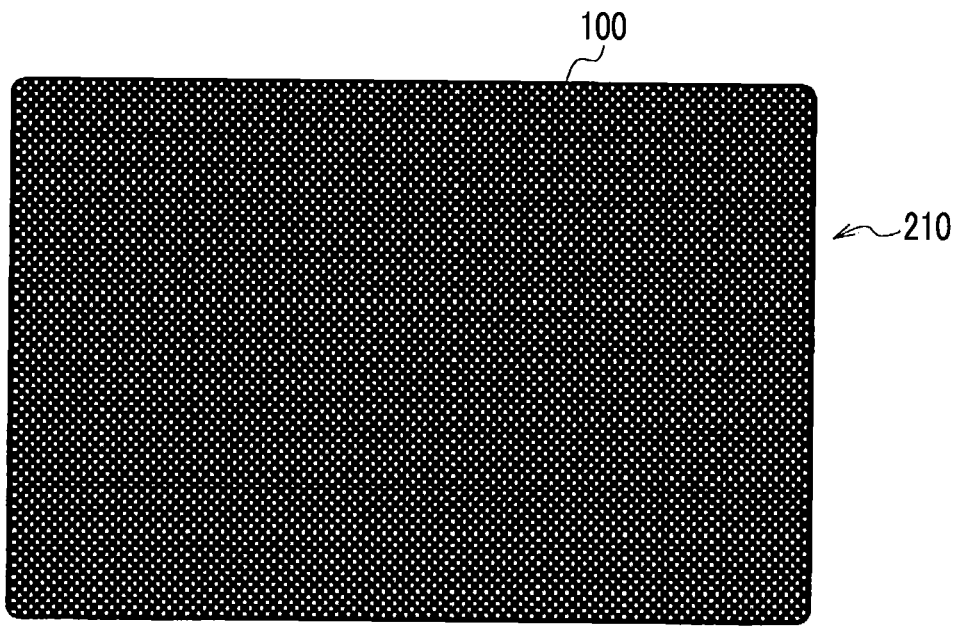
FIGS. 5A and 5B are schematic diagrams illustrating an example of a method of evaluating the viewing angle evaluation image according to the first exemplary embodiment.
Figure 5B:
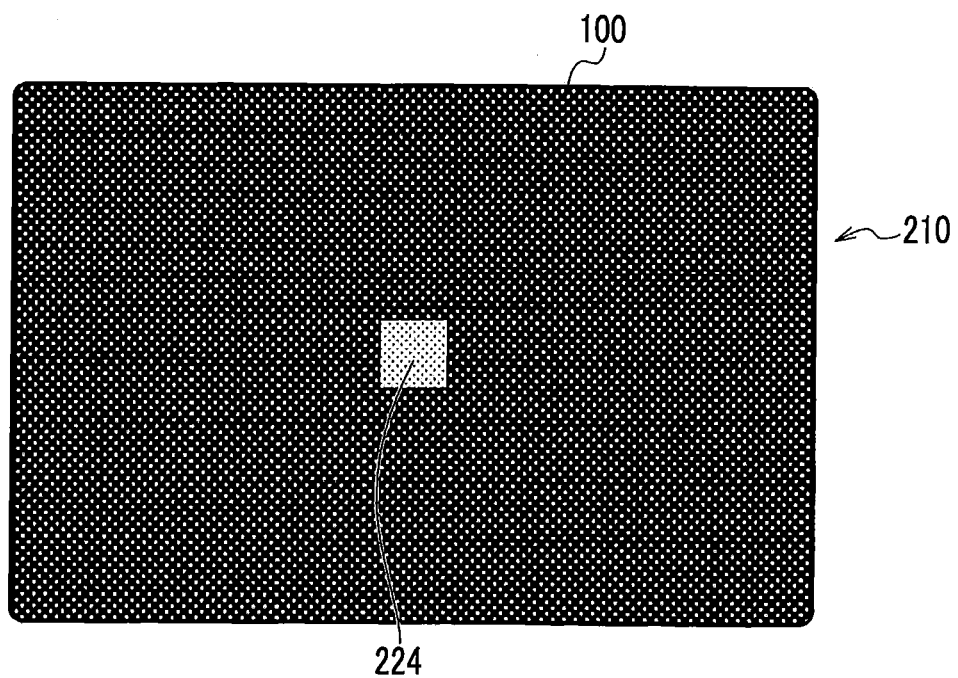

For example, when there is a response that the second evaluation image 224 may be identified when the second evaluation image 224 is viewed from the viewing point Vp2 and there is a response that the second evaluation image 224 is not identified when the second evaluation image 224 is viewed from the viewing point Vp3, the viewing angle of the viewing point Vp2 is considered a good evaluation result, and the viewing angle of the viewing point Vp3 is considered a bad evaluation result. FIGS. 5A and 5B are diagrams illustrating an example of the evaluation of the viewing angle evaluation image 210. FIG. 5A illustrates the appearance of the viewing angle evaluation image 210 determined to be a poor viewing angle, and FIG. 5B illustrates the appearance of the viewing angle evaluation image 210 determined to be a good viewing angle.

On the other hand, when the gradation characteristic evaluation image 200 of the gradation before one step in a direction in which it is difficult to identify the gradation is set as the viewing angle evaluation image 210, the viewing angle evaluation image generation unit 63 sets the gradation value of the reference image 220 to R(255, 0, 0) and sets the gradation value of the second evaluation image 224 to RW(k−1) (255, a(k−1), a(k−1)), that is, the gradation value of the first evaluation image 222 before one step for the boundary image, based on the gradation value RW (k) of the boundary image. The first evaluation image 222 of the gradation value RW(k−1) is the first evaluation image 222 that is not identified by the viewer.

In this case, the viewing angle evaluation unit 64 that receives from the input receiving unit 65 a response regarding the identification of the second evaluation image 224 when viewed from the viewing points Vp2 and Vp3 performs determination as a good viewing angle for the viewing point Vp corresponding to the response that the second evaluation image 224 is not identified and as a poor viewing angle for the viewing point Vp corresponding to the response that the second evaluation image 224 may be identified, thereby performing viewing angle evaluation for each viewing point.

As described above in detail, in the display evaluation device according to the present exemplary embodiment, the presence or absence of the change in color of the display device is evaluated. Since the viewing angle is evaluated according to the response regarding whether or not the viewing angle evaluation image 210 is identified, evaluation itself is simple. In addition, since there is little room for the subjectivity of the viewer, more accurate evaluation is performed.

In the gradation characteristic evaluation image 200 according to the present exemplary embodiment, the first evaluation image 222 of the gradation value in a direction of addition for the gradation value of the reference color R(255, 0, 0) is sequentially generated and is displayed on the display screen 100. However, the invention is not limited thereto, and the first evaluation image 222 of the gradation value in a direction of subtraction for the reference color may be generated and displayed on the display screen 100. In this case, the reference color of the reference image 220 may be changed so as to be suitable for the generation of the first evaluation image 222 of the gradation value in the direction of subtraction.

In addition, although the example in which the gradation characteristic evaluation image 200 is generated by adding the gradation value in a direction toward W from the reference color R has been described in the above exemplary embodiment, the invention is not limited thereto. For example, the gradation characteristic evaluation image 200 may be generated by adding the gradation value in a direction toward Y from the reference color R. In this case, it is preferable to set the gradation value of the first evaluation image 222 to RY(i) (255, b(i), 0) (0<b (i)<255, i is an integer of 1 to N) and add the value of b(i) gradually to increase it.

In addition, although the example in which the gradation characteristic evaluation image generation unit 61 changes the gradation of the first evaluation image 222 and sequentially displays the first evaluation images 222 and the viewer designates a boundary image from the first evaluation images 222 in the evaluation of the gradation characteristics has been described in the above exemplary embodiment, the invention is not limited thereto. For example, the viewer may input whether or not identification is possible whenever the gradation characteristic evaluation image generation unit 61 displays the first evaluation images 222 of different gradations, and the gradation characteristic evaluation unit 62 may specify the boundary image based on the input.

In addition, although the example in which the gradation value of the first evaluation image 222 is gradually (discretely) changed has been described in the above exemplary embodiment, the invention is not limited thereto, and the gradation value of the first evaluation image 222 may be continuously changed. In this case, it is preferable that, in the evaluation of the gradation characteristics, the viewer views the first evaluation image 222 whose gradation value changes continuously and designates the first evaluation image 222 of the gradation value, which begins to be viewed, through the input device 30 (59).

In addition, in the above exemplary embodiment, the example has been described in which plural gradation characteristic evaluation images 200 are displayed on the display screen of the display device 20 (57) in a sequential manner in a direction in which the gradation is easily identified from the gradation characteristic evaluation image in which it is difficult to identify the gradation. On the contrary, plural gradation characteristic evaluation images 200 may be displayed on the display screen of the display device 20 (57) in a sequential manner in a direction in which it is difficult to identify the gradation from the gradation characteristic evaluation image in which the gradation is easily identified. In addition, plural gradation characteristic evaluation images 200 may be randomly displayed on the display screen of the display device 20 (57).

In addition, in the above exemplary embodiment, for the viewing angle evaluation image 210, a gradation characteristic evaluation image of the gradation before one step in a direction in which it is difficult to identify the gradation for the gradation of the boundary image is used. However, the invention is not limited thereto, and a gradation characteristic evaluation image of the gradation before plural steps may be used. Alternatively, the viewing angle evaluation image 210 may be generated by setting a new gradation value based on the gradation value of the boundary image.

In addition, although the gradation characteristic evaluation image 200 or the viewing angle evaluation image 210 is displayed in the central portion of the display screen 100 in the present exemplary embodiment, the invention is not limited thereto. For example, the gradation characteristic evaluation image 200 or the viewing angle evaluation image 210 may be displayed on the periphery of the display screen 100.

In addition, although the viewing point Vp1 in front view is set as a viewing point to evaluate the gradation characteristic evaluation image 200 in the present exemplary embodiment, the invention is not limited thereto, and viewing points of predetermined viewing angles other than the viewing point Vp1 in front view may be used.

Next, a method of determining the gradation value (color) applied to the reference color and the evaluation color according to the present exemplary embodiment will be described in more detail with reference to FIG. 6. In FIG. 6, the coordinates (gradation values) of points P1 to P7 are P1(128, 255, 255), P2 (128, 255, 128), P3 (255, 255, 128), P4(128, 128, 255), P5(128, 128, 128), P6(255, 128, 128), and P7(255, 128, 255).

The gradation values of the reference color and the evaluation color are not particularly limited, and may be determined by selective combination. However, it is preferable to determine the gradation values of the reference color and the evaluation color using the gradation values in a portion, which is obtained by excluding a cube including the points P1 to P7 and W illustrated in FIG. 6 from the cube including the vertices Bk, R, G, B, Y, M, C, and W, since the viewer may easily identify the gradation characteristic evaluation image 200 and the viewing angle evaluation image 210. This is because the sensitivity of the human eye in a region of a small gradation value is larger than that in a region of a large gradation value. Here, the boundary value 128 in the gradation values of P1 to P7 is just an example, and may be set according to the characteristics of the display device 20 (57) or the like.

In addition, when human vision characteristics are similarly taken into consideration, it is more preferable to set the gradation value of the reference color to a gradation value including at least one 0 in the coordinate components within the RGB color space (or at least one value within a predetermined range from 0), that is, vertices Bk(0, 0, 0), R(255, 0, 0), G(0, 255, 0), B(0, 0, 255), Y(255, 255, 0), M(255, 0, 255), and C(0, 255, 255). This is because the gradation in the coordinate component set to 0 is not changed.

In addition, although the example using R(255, 0, 0) as the reference color and the evaluation color has been described in the above exemplary embodiment, the invention is not limited thereto, and other colors, such as G, B, Y, M, and C, may be used. In addition, when performing the display evaluation process according to the present exemplary embodiment by using multiple colors in combination, it is possible to obtain more accurate evaluation results for the color. When performing evaluation by using multiple colors in combination, it is preferable to perform the above-described display evaluation process by the number of colors.

When C(0, 255, 255) is used as an example of the reference color and the evaluation color other than R(255, 0, 0), for example, it is preferable to set the gradation value of the first evaluation image 222 to a gradation value CW(c, 255, 255) (0<c<255) in a direction toward W from C and to change the value of the variable c. Alternatively, when C'(0, 128, 128) is used as an example of the reference color and the evaluation color, for example, it is preferable to set the gradation value of the first evaluation image 222 to a gradation value CW(d, 128, 128) (0<d<255) in a direction toward W from C and to change the value of the variable d.

On the other hand, the gradation characteristic evaluation image 200 may be generated by determining the gradation value of the first evaluation image 222 by addition or subtraction with respect to the reference image 220 of the reference color having a large gradation value. In this case, however, it is difficult to identify the gradation when human vision characteristics are taken into consideration. For example, the case is such that the gradation characteristic evaluation image 200 is generated by using C(0, 255, 255) as the reference color and setting the gradation value of the first evaluation image 222 to a gradation value CBk(0, 255-e, 255-e) (0<e<255) in a direction toward Bk from C or to a gradation value CB(0, 255-f, 255) (0<f<255) in a direction toward B from C.

In addition, a combination of halftone colors may be used as the reference color and the evaluation color. In this case, as described previously, it is difficult to identify the gradation in a region of a large gradation value due to human vision characteristics. Therefore, it is preferable to set the gradation values of the reference color and the evaluation color to gradation values less than a gradation value (for example, 128) set in advance.

Specifically, in the case of gray, assuming that the reference color is set to (60, 60, 60), the evaluation color of (60+g, 60+g, 60+g) (0<g<68) is selected. In the case of a color other than gray, assuming that (64, 32, 0) is adopted as the reference color, the evaluation color of (64+h, 32+h, h) (0<h<64) is selected.

In addition, although the example in which the evaluation color is determined by adding and subtracting the same value to and from each gradation value of RGB has been described in the present exemplary embodiment, it is also possible to determine the evaluation color by adding and subtracting different values to and from each gradation value of RGB. Specifically, when (60, 60, 60) is selected as the reference color, the evaluation color of (60+g1, 60+g2, 60+g3) (0<g1, g2, g3<68, g1≠g2≠g3) is selected.

Second Exemplary Embodiment

A display evaluation device according to the present exemplary embodiment will be described with reference to FIGS. 7A to 10B. The display evaluation device according to the present exemplary embodiment is realized by changing the forms of the gradation characteristic evaluation image and the viewing angle evaluation image in the display evaluation device according to the first exemplary embodiment. In the present exemplary embodiment, an example will be described in which a gradation characteristic evaluation image of the gradation before one step in a direction in which it is difficult to identify the gradation for the gradation of the boundary image is used as a viewing angle evaluation image.

Figure 7A:
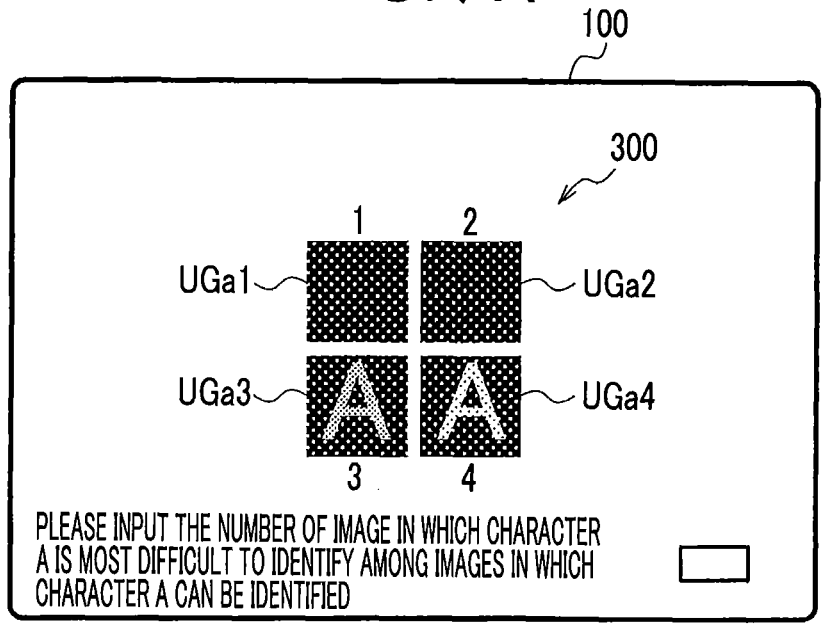
FIGS. 7A and 7B are schematic diagrams illustrating examples of a gradation characteristic evaluation image and a viewing angle evaluation image generated by a display evaluation device according to a second exemplary embodiment.
Figure 7B:
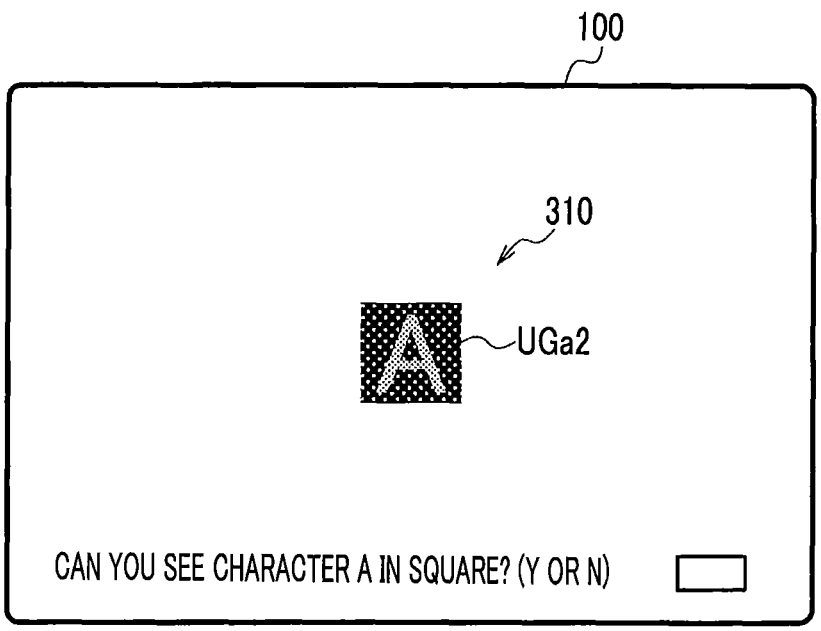

FIG. 7A illustrates a gradation characteristic evaluation image 300 displayed on the display screen 100 together with a message with an input box showing "Please input the number of the image in which the character A is the most difficult to identify among images in which the character A may be identified". In addition, FIG. 7B illustrates a viewing angle evaluation image 310 displayed on the display screen 100 together with a message with an input box showing "Can you see character A in square? (Y or N)".

Figure 8:
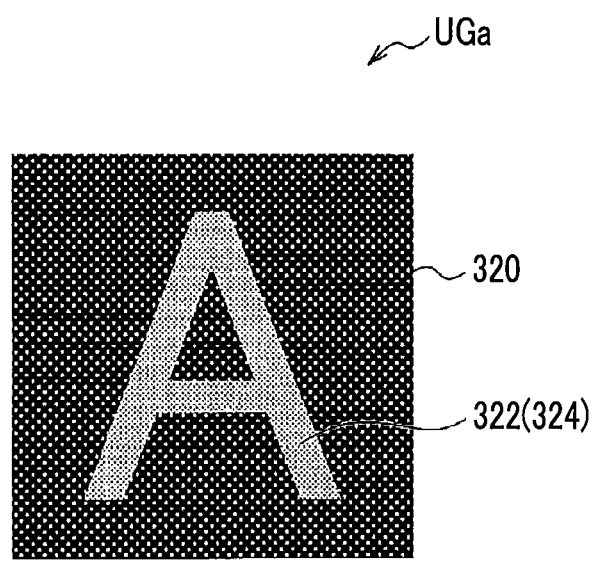
FIG. 8 is a schematic diagram illustrating a unit image according to the second exemplary embodiment.

As illustrated in FIG. 7A, the gradation characteristic evaluation image 300 according to the present exemplary embodiment is configured to include a set of four unit images UGa, that is, UGa1 to UGa4. As illustrated in FIG. 8, the unit image UGa is configured to include a reference image 320 of the reference color and a first evaluation image 322 (a portion of the character A included in the reference image 320) of the evaluation color.

In the display evaluation device according to the first exemplary embodiment, the gradation characteristic evaluation images 200 obtained by changing the gradation value of the first evaluation image 222 are sequentially displayed on the display screen 100. In contrast, in the display evaluation device according to the present exemplary embodiment, the gradation characteristic evaluation image generation unit 61 generates the gradation characteristic evaluation image 300 in which a set of unit images UGa1 to UGa4 including the first evaluation image 322 obtained by changing the gradation value are arranged in advance, and outputs the gradation characteristic evaluation image 300 to the display device 20 (57) to display the gradation characteristic evaluation image 300 on the display screen 100. In addition, the gradation value of the first evaluation image 322 with respect to the gradation value of the reference image 320 is arranged such that the reference image 320 and the first evaluation image 322 are easily identified in order of UGa1, UGa2, UGa3, and UGa4.

The viewer E views the gradation characteristic evaluation image 300 from the viewing point Vp1 on the front side, and designates the unit image UGa (that is, a boundary image) in which the identification of the first evaluation image 322 is the most difficult, among the unit images UGa1 to UGa4, through the input device 30 (59) according to the above-described message. Here, it is assumed that the unit image UGa3 is designated.

As illustrated in FIG. 7B, the viewing angle evaluation image generation unit 63 that acquires the designation of the unit image UGa3 through the gradation characteristic evaluation unit 62 generates the unit image UGa2 as the viewing angle evaluation image 310, outputs the unit image UGa2 to the display device 20 (57), and displays the unit image UGa2 on the display screen 100.

That is, in the viewing angle evaluation image 310, a second evaluation image 324 is formed by setting the first evaluation image 322 of the unit image UGa illustrated in FIG. 8 to have a gradation of the unit image UGa2. Accordingly, when the viewer views the viewing angle evaluation image 310 from the front side, the reference image 320 and the second evaluation image 324 may not be identified (viewing angle evaluation image 310 is viewed as a square of one color of reference color).

As illustrated in FIG. 7B, the viewer E views the viewing angle evaluation image 310 from viewing points Vp2 and Vp3, which are different from the viewing point Vp1 in front view, and sends a response regarding whether or not the second evaluation image 324 is identified through the input device 30 (59) according to the above-described message. Undoubtedly, the viewing point Vp1 in front view may be included in the viewing points during the viewing angle evaluation.

The viewing angle evaluation unit 64 performs determination as a good viewing angle for the viewing point Vp corresponding to the response that the second evaluation image 324 is not identified and as a poor viewing angle for the viewing point Vp corresponding to the response that the second evaluation image 324 may be identified, thereby performing viewing angle evaluation for each viewing point.

Figure 9A:
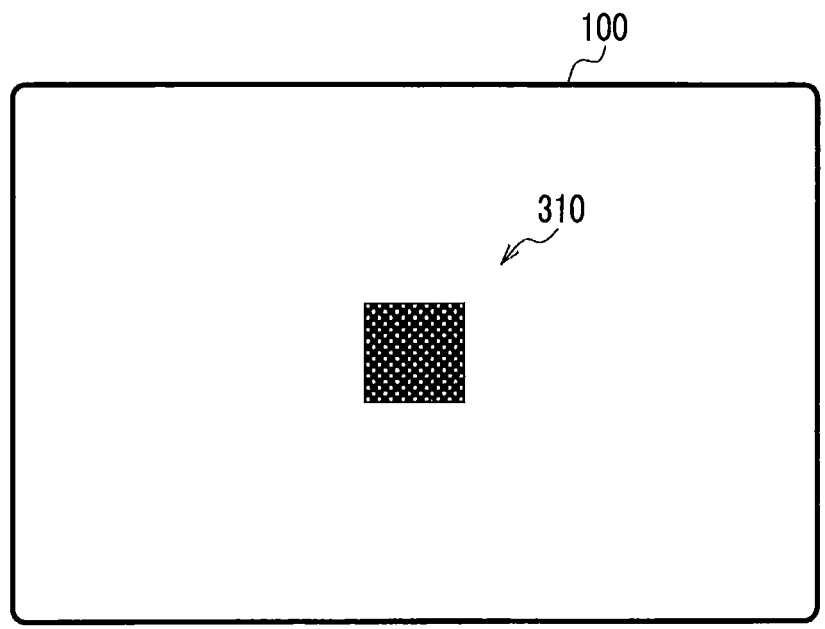
FIGS. 9A and 9B are schematic diagrams illustrating an example of a method of evaluating the viewing angle evaluation image according to the second exemplary embodiment.
Figure 9B:
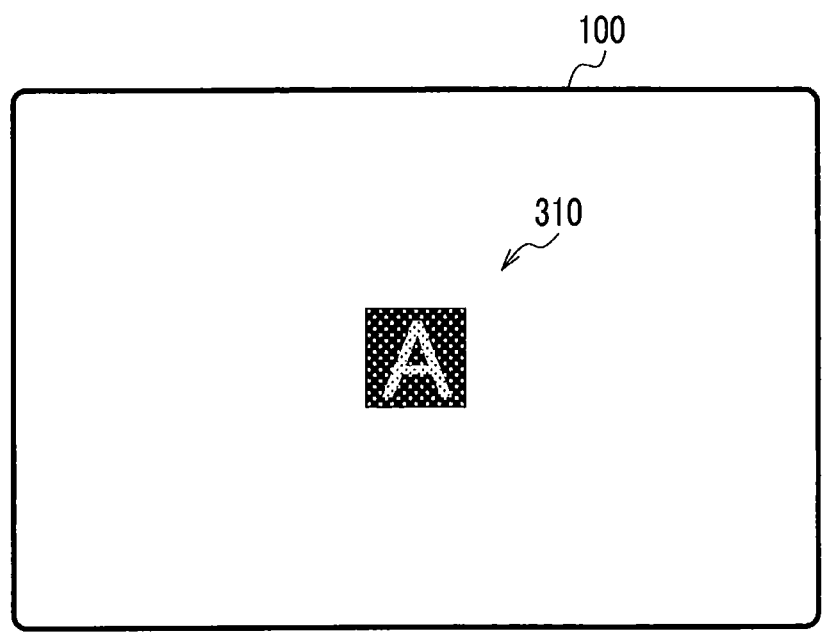

FIGS. 9A and 9B are diagrams illustrating an example of the evaluation of the viewing angle evaluation image 310. FIG. 9A illustrates the appearance of the viewing angle evaluation image 310 determined to be a good viewing angle, and FIG. 9B illustrates the appearance of the viewing angle evaluation image 310 determined to be a poor viewing angle.

In the display evaluation device according to the present exemplary embodiment, since the first evaluation image 322 (a portion of the character A illustrated in FIG. 8) of the gradation characteristic evaluation image 300 and the second evaluation image 324 (a portion of the character A illustrated in FIG. 8) of the viewing angle evaluation image 310 are characters, it is necessary to determine whether or not character identification is possible (whether or not recognition as the character is possible) in addition to determining whether or not image identification is possible. Therefore, the accuracy of display evaluation is further improved.

In addition, although the example in which the gradation characteristic evaluation image 300 is displayed in the central portion of the display screen 100 has been described in the present exemplary embodiment, the invention is not limited thereto, and the gradation characteristic evaluation image 300 may be displayed at any position of the display screen 100. In addition, although the example in which the unit images UGa1 to UGa4 forming the gradation characteristic evaluation image 300 are displayed on the display screen 100 so as to be concentrated has been described in the present exemplary embodiment, the invention is not limited thereto, and the unit images UGa1 to UGa4 may be displayed on the display screen 100 so as to be spaced apart from each other by a distance set in advance. When the unit images UGa1 to UGa4 are displayed on the display screen 100 so as to be concentrated, the influence of brightness distribution (display unevenness) based on the characteristics of display screen 100 itself is suppressed and the variation of the viewing angle is suppressed, which is more preferable.

In addition, although the example in which the second evaluation image 324 is a character has been described in the present exemplary embodiment, the invention is not limited thereto. For example, the second evaluation image 324 may be a figure or the like.

Here, another example of the viewing angle evaluation method according to the present exemplary embodiment will be described with reference to FIGS. 10A and 10B. In the exemplary embodiment described above, as illustrated in the viewing points Vp2 and Vp3 of FIG. 7B, the viewer E views the viewing angle evaluation image 310 while changing the viewing point. In the present exemplary embodiment, however, the viewing point of the viewer E is the same, and the display position of the viewing angle evaluation image 310 on the display screen 100 is changed to perform viewing angle evaluation.

Figure 10A:
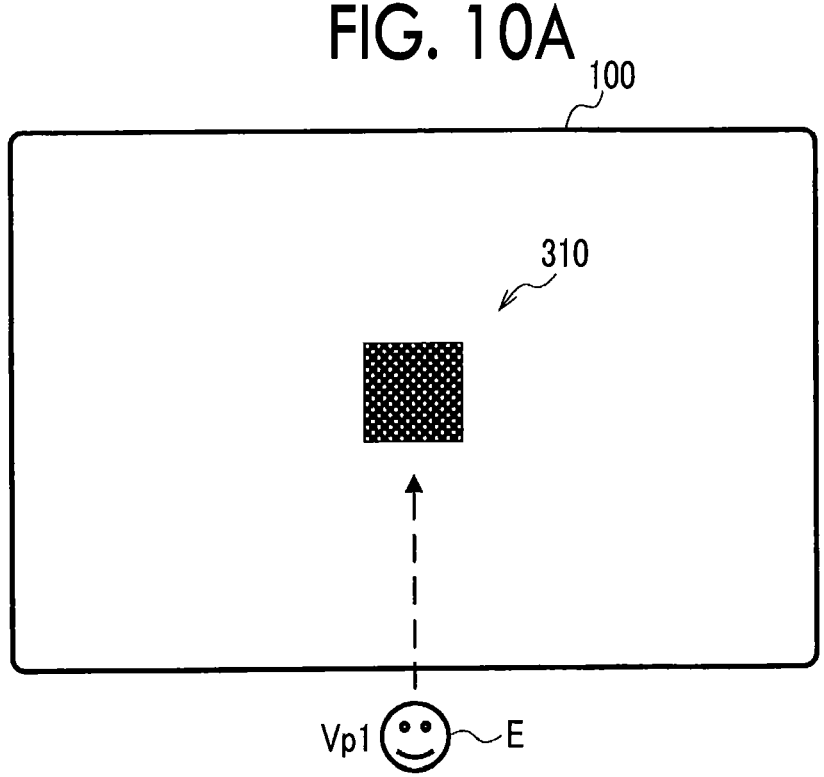
FIGS. 10A and 10B are schematic diagrams illustrating another example of the viewing angle evaluation method according to the second exemplary embodiment.
Figure 10B:
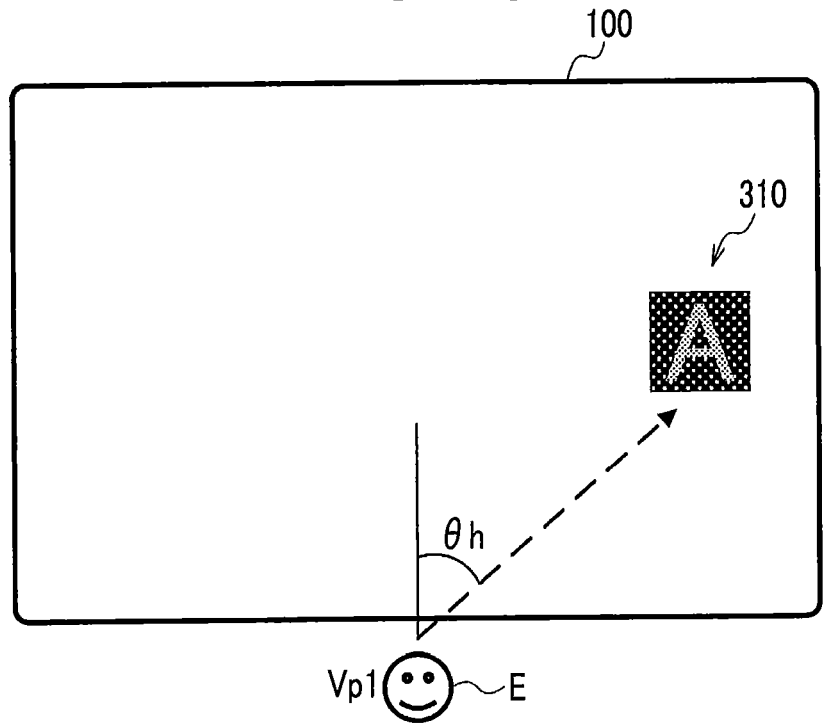

As illustrated in FIG. 10A, first, the viewing angle evaluation image generation unit 63 generates the viewing angle evaluation image 310 so as to be viewed from the viewing point Vp1 on the front side by the viewer E, outputs the viewing angle evaluation image 310 to the display device 20 (57), and displays the viewing angle evaluation image 310 on the display screen 100.

Then, the viewer E sends a response regarding whether or not the second evaluation image 324 of the viewing angle evaluation image 310 is identified through the input device 30 (59).

Then, the viewing angle evaluation image generation unit 63 generates the viewing angle evaluation image 310 at the position of the viewing angle θh on the display screen 100, outputs the viewing angle evaluation image 310 to the display device 20 (57), and displays the viewing angle evaluation image 310 on the display screen 100.

Then, the viewer E sends a response regarding whether or not the second evaluation image 324 of the viewing angle evaluation image 310 is identified through the input device 30 (59).

The viewing angle evaluation unit 64 performs determination as a good viewing angle for the response that the second evaluation image 324 is not identified and as a poor viewing angle for the response that the second evaluation image 324 may be identified based on the response regarding the identification of the second evaluation image 324 when the second evaluation image 324 is viewed from the front side and the viewing angle θh, thereby performing evaluation of each viewing angle.

Also through the display evaluation device described above, the same effects as in the above-described exemplary embodiment are obtained.

Third Exemplary Embodiment

A display evaluation device according to the present exemplary embodiment will be described with reference to FIGS. 11A to 14. The display evaluation device according to the present exemplary embodiment is realized by changing the forms of the gradation characteristic evaluation image and the viewing angle evaluation image in the display evaluation device according to the second exemplary embodiment. In the present exemplary embodiment, an example will be described in which a gradation characteristic evaluation image of the gradation before one step in a direction in which it is difficult to identify the gradation for the gradation of the boundary image is used as a viewing angle evaluation image.

FIG. 11A illustrates a gradation characteristic evaluation image 400 displayed on the display screen 100 together with a message with an input box showing "Please input the number of the image that is the most difficult to identify among images in which two squares may be identified". In addition, FIG. 11B illustrates a viewing angle evaluation image 410 displayed on the display screen 100 together with a message with an input box showing "Can you see two squares? (Y or N)".

Figure 12A:
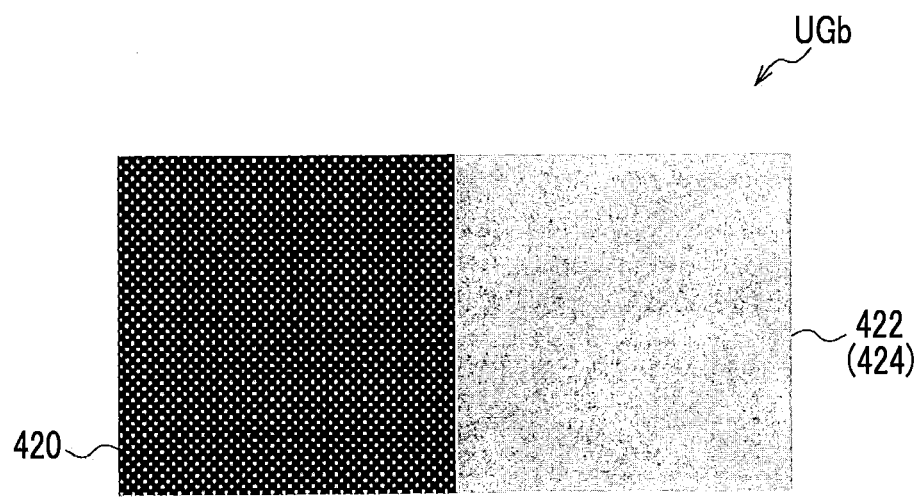
FIGS. 12A and 12B are schematic diagrams illustrating a unit image according to the third exemplary embodiment.

As illustrated in FIG. 11A, the gradation characteristic evaluation image 400 according to the present exemplary embodiment is configured to include a set of four unit images UGb, that is, UGb1 to UGb4. As illustrated in FIG. 12A, in the unit image UGb, a reference image 420 of reference color and a first evaluation image 422 of evaluation color are disposed adjacent to each other. In addition, the gradation value of the first evaluation image 422 with respect to the gradation value of the reference image 420 is arranged such that the reference image 420 and the first evaluation image 422 are easily identified in order of UGb1, UGb2, UGb3, and UGb4.

In the display evaluation device according to the second exemplary embodiment, the gradation characteristic evaluation image 300 is generated by arranging plural unit images UGa side by side such that the first evaluation image 322 is included in the reference image 320 in each unit image UGa. In contrast, the gradation characteristic evaluation image generation unit 61 of the display evaluation device according to the present exemplary embodiment generates the gradation characteristic evaluation image 400 by arranging plural unit images UGb side by side such that the reference image 420 and the first evaluation image 422 are disposed adjacent to each other in each unit image UGb. Then, the generated gradation characteristic evaluation image 400 is output to the display device 20 (57), and is displayed on the display screen 100.

As illustrated in FIG. 11A, the viewer E views the gradation characteristic evaluation image 400 from the viewing point Vp1 on the front side, and designates the unit image UGb (that is, a boundary image) in which the identification of the reference image 420 and the first evaluation image 422 is the most difficult, among the unit images UGb1 to UGb4, through the input device 30 (59) according to the above-described message. Here, it is assumed that the unit image UGb3 is designated.

As illustrated in FIG. 11B, the viewing angle evaluation image generation unit 63 that acquires the designation of the unit image UGb3 through the gradation characteristic evaluation unit 62 generates the unit image UGb2 as the viewing angle evaluation image 410, outputs the unit image UGb2 to the display device 20 (57), and displays the unit image UGb2 on the display screen 100.

That is, in the viewing angle evaluation image 410, a second evaluation image 424 is formed by setting the first evaluation image 422 of the unit image UGb illustrated in FIG. 12A to have a gradation of the unit image UGb2. Accordingly, when the viewer views the viewing angle evaluation image 410 from the front side, the reference image 420 and the second evaluation image 424 may not be identified (viewing angle evaluation image 410 is viewed as a rectangle of one color of reference color).

As illustrated in FIG. 11B, the viewer E views the viewing angle evaluation image 410 from viewing points Vp2 and Vp3, which are different from the viewing point Vp1 in front view, and sends a response regarding whether or not the reference image 420 and the second evaluation image 424 are identified through the input device 30 (59) according to the above-described message. Undoubtedly, the viewing point Vp1 in front view may be included in viewing points during the viewing angle evaluation.

Figure 13A:
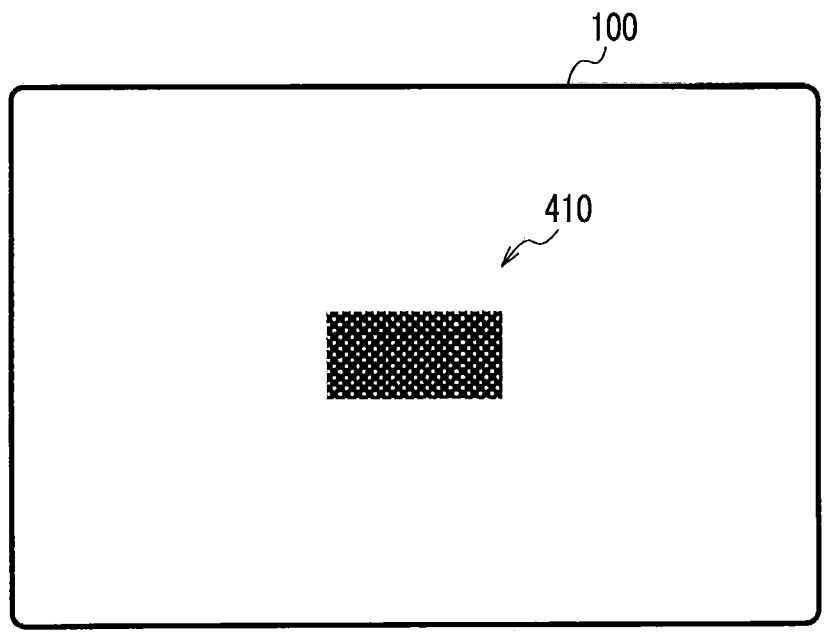
FIGS. 13A and 13B are schematic diagrams illustrating an example of a method of evaluating the viewing angle evaluation image according to the third exemplary embodiment.
Figure 13B:
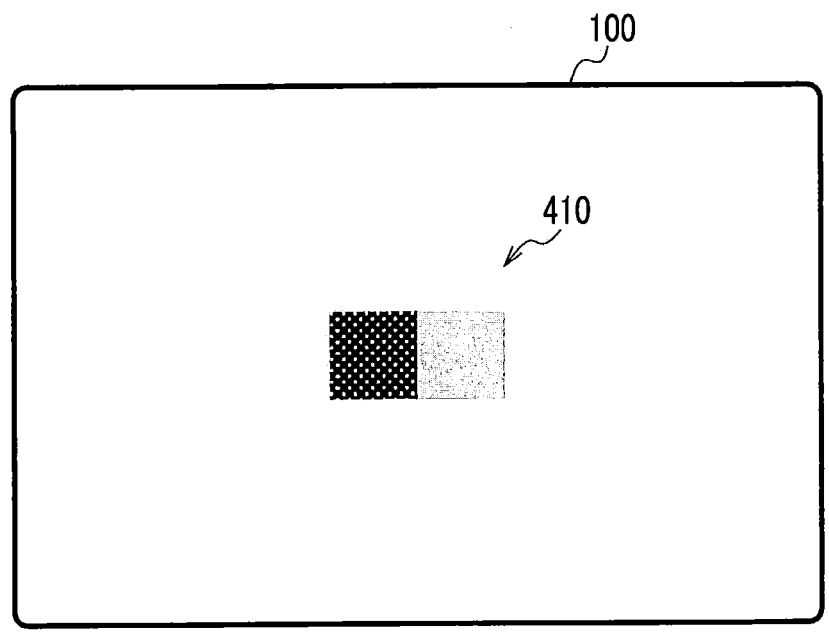

The viewing angle evaluation unit 64 performs determination as a good viewing angle for the viewing point Vp corresponding to the response that the reference image 420 and the second evaluation image 424 is not identified and as a poor viewing angle for the viewing point Vp corresponding to the response that the reference image 420 and the second evaluation image 424 may be identified, thereby performing viewing angle evaluation for each viewing point. FIGS. 13A and 13B are diagrams illustrating an example of the evaluation of the viewing angle evaluation image 410. FIG. 13A illustrates the appearance of the viewing angle evaluation image 410 determined to be a good viewing angle, and FIG. 13B illustrates the appearance of the viewing angle evaluation image 410 determined to be a poor viewing angle.

Also through the display evaluation device described above, the same effects as in the above-described exemplary embodiment are obtained.

In addition, in the present exemplary embodiment, as illustrated in FIG. 12A, the example has been described in which the reference image 420 and the first evaluation image 422 (second evaluation image 424) of the unit image UGb are disposed adjacent to each other. However, the invention is not limited thereto, and the reference image 420 and the first evaluation image 422 (second evaluation image 424) of the unit image UGb may be disposed so as to be spaced apart from each other by a distance d set in advance as illustrated in FIG. 12B.

Figure 12B:
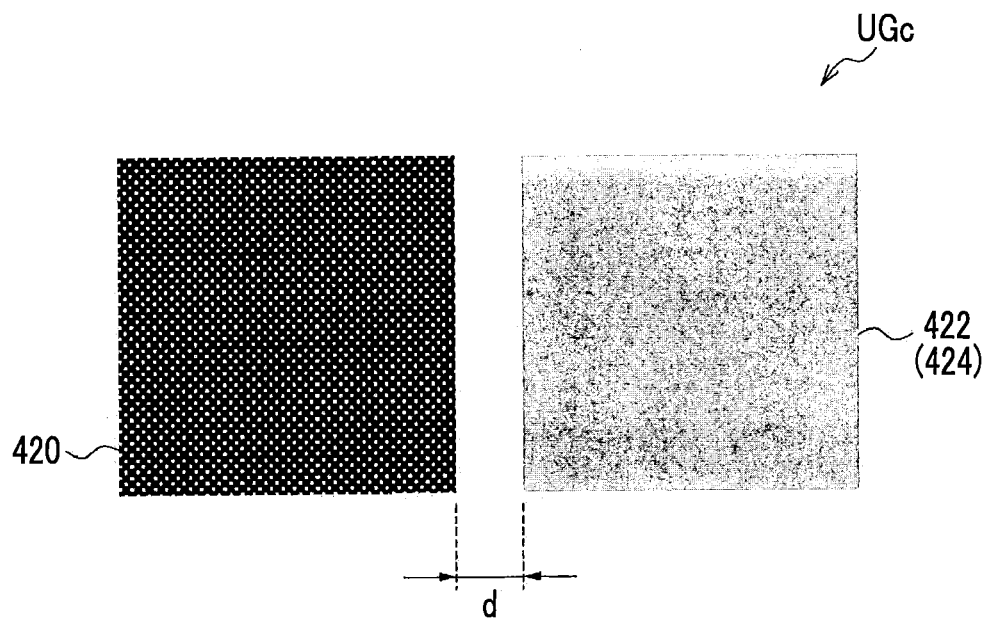

In addition, in the present exemplary embodiment, as illustrated in FIGS. 12A and 12B, the example has been described in which the reference image 420 is disposed on the left side and the first evaluation image 422 (second evaluation image 424) is disposed on the right side. However, the reference image 420 may be disposed on the right side and the first evaluation image 422 (second evaluation image 424) may be disposed on the left side.

In addition, in the method of displaying the gradation characteristic evaluation image 400 on the display screen 100 according to the present exemplary embodiment, the description that "gradation characteristic evaluation image 400 may be displayed at any position of the display screen 100" and "unit images UGb may be displayed so as to be spaced apart from each other" is the same as in the case of the gradation characteristic evaluation image 300 according to the second exemplary embodiment.

Figure 14:
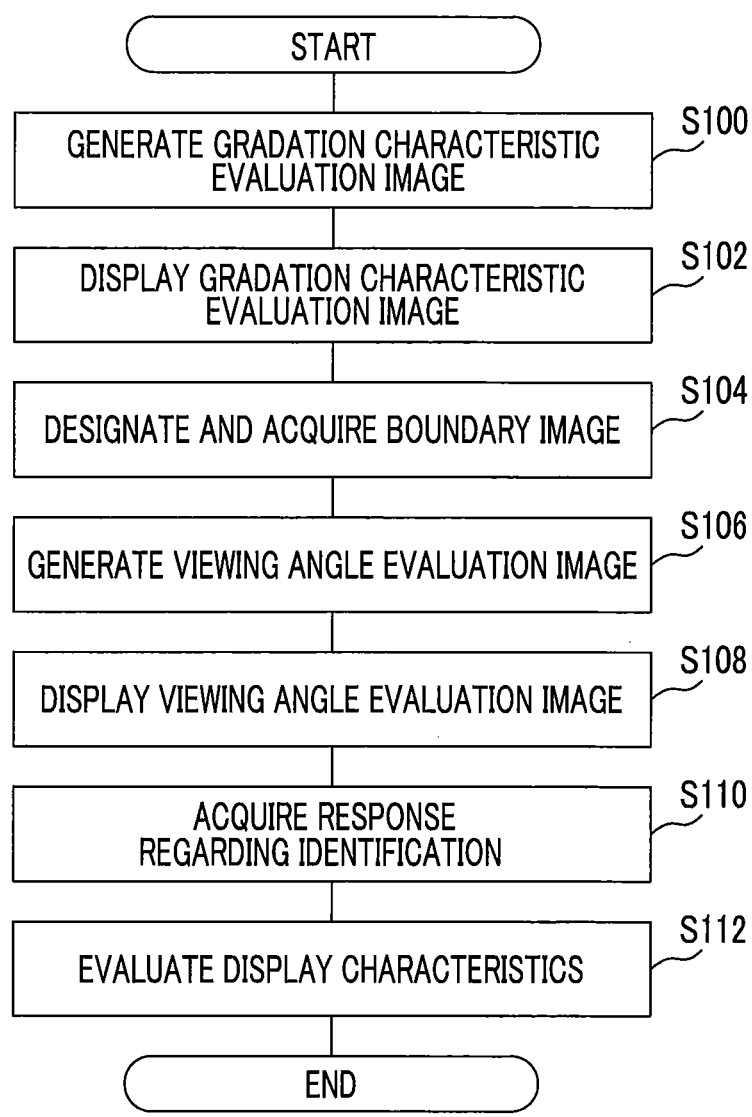
FIG. 14 is a flowchart illustrating the process flow of a display evaluation program according to the first to third exemplary embodiments.

Next, the display evaluation process performed by the display evaluation device 60 according to the present exemplary embodiment will be described with reference to FIG. 14. FIG. 14 is a flowchart illustrating the process flow of a display evaluation program executed by the arithmetic unit 11 (51) of the information processing apparatus 10 (50) according to the present exemplary embodiment. In addition, the display evaluation program is a program that is also used in common in the display evaluation process according to the first exemplary embodiment and the display evaluation process according to the second exemplary embodiment.

In the process illustrated in FIG. 14, when an instruction to start the execution is given, the arithmetic unit 11 (51) reads a display evaluation program from the storage unit 12 (52), the storage device 15 (55), or the like and executes the display evaluation program. In the present exemplary embodiment, the example has been described in which the display evaluation program is stored in the storage unit 12 (52), the storage device 15 (55), or the like in advance. However, the invention is not limited thereto, and the display evaluation program may be provided in a state where the display evaluation program is stored in a portable storage medium so as to be readable by an information processing apparatus, or the display evaluation program may be distributed through a cable or a wireless communication unit.

In addition, in the present exemplary embodiment, the display evaluation process is realized by a software configuration using a computer that is based on the execution of the program. However, the invention is not limited thereto. For example, the display evaluation process may be realized by a hardware configuration using an application specific integrated circuit (ASIC) or by combination of a hardware configuration and a software configuration.

As illustrated in FIG. 14, in step S100, the gradation characteristic evaluation image 400 (200, 300) is generated. Then, in step S102, the generated gradation characteristic evaluation image 400 (200, 300) is displayed on the display screen 100. This process is a process that is mainly performed in the gradation characteristic evaluation image generation unit 61 and the display device 20 (57) illustrated in FIG. 2.

Then, in step S104, the viewer who views the gradation characteristic evaluation image 400 (200, 300) designates a boundary image through the input device 30 (59), thereby acquiring a boundary image. This process is a process that is mainly performed in the gradation characteristic evaluation unit 62 illustrated in FIG. 2.

Then, in step S106, the viewing angle evaluation image 410 (210, 310) is generated based on the boundary image acquired in step S104. Then, in step S108, the generated viewing angle evaluation image 410 (210, 310) is displayed on the display screen 100. This process is a process that is mainly performed in the viewing angle evaluation image generation unit 63 and the display device 20 (57) illustrated in FIG. 2. As described above, the viewing angle evaluation image 410 (210, 310) according to the present exemplary embodiment is generated by selecting the gradation characteristic evaluation image 400 (200, 300) in which the gradation value of the boundary image is changed by one step in a direction in which it is difficult to identify the gradation.

Then, in step S110, the viewer who views the viewing angle evaluation image 410 (210, 310) sends a response regarding identification through the input device 30 (59), thereby acquiring a result of identification for each viewing angle. This process is a process that is mainly performed in the viewing angle evaluation unit 64 illustrated in FIG. 2.

Then, in step S112, the display characteristics of the display device 20 (57) are evaluated based on the response regarding the identification of the viewing angle evaluation image 410 (210, 310) acquired in step S110. In this case, the viewing angle evaluation unit 64 performs determination as a good viewing angle for the viewing point Vp corresponding to the response that the viewing angle evaluation image 410 is not identified and as a poor viewing angle for the viewing point Vp corresponding to the response that the viewing angle evaluation image 410 may be identified. This process is a process that is mainly performed in the viewing angle evaluation unit 64 illustrated in FIG. 2. Then, the display evaluation program is ended.

Fourth Exemplary Embodiment

The display evaluation device according to the present exemplary embodiment will be described with reference to FIGS. 15A to 16. The present exemplary embodiment is a display evaluation device that determines a region suitable for viewing (hereinafter, this region may be referred to as a "suitable viewing region") on the display screen of the display device disposed in a space, such as a living room, using a display evaluation result of the display evaluation device according to each of the exemplary embodiments described above.

Figure 15A:
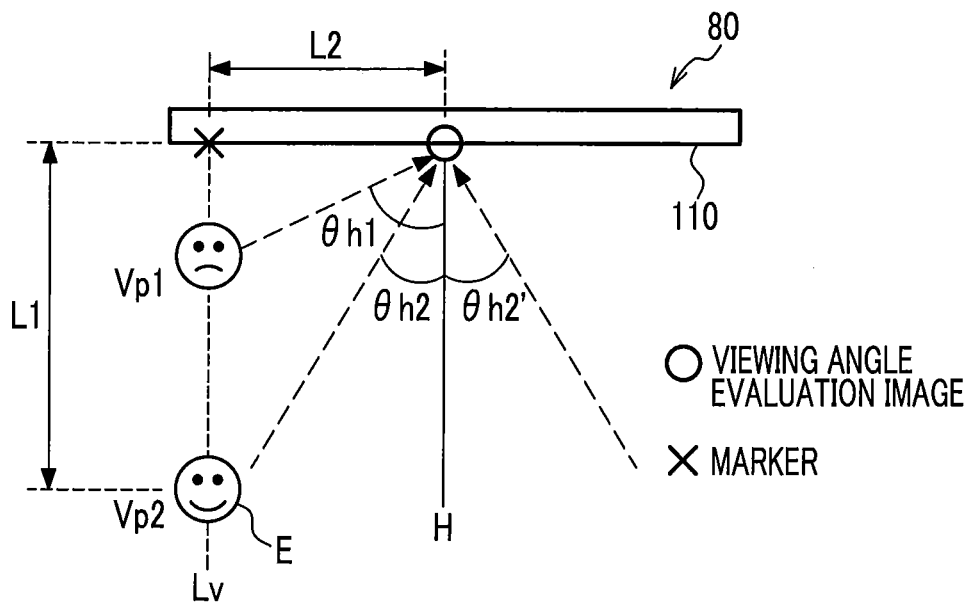
FIGS. 15A and 15B are schematic diagrams illustrating an example of a method of determining a suitable viewing region according to a fourth exemplary embodiment.

FIG. 15A illustrates an example of the method of determining the suitable viewing region in a display device 80 placed in a space, such as a living room.

In the display evaluation device according to the present exemplary embodiment, first, a viewing angle evaluation image (indicated by O in FIG. 15A) and a marker (indicated by X in FIG. 15A) specifying a position on a display screen 110 are displayed on the display screen 110 of the display device 80. In addition, in FIG. 15A, a perpendicular line Lv indicates a perpendicular line passing through the marker among the perpendicular lines with respect to the display screen 110, and a normal line H indicates a normal line passing through the viewing angle evaluation image among the normal lines with respect to the display screen 110.

Then, the viewer E moves on the perpendicular line Lv while viewing the viewing angle evaluation image, and sends, through the input device 30 (59), a response regarding the determination result of the viewing angle evaluation image (regarding whether or not the viewing angle evaluation image is identified) at the viewing point of the viewing angle set in advance. Here, as a viewing angle evaluation image according to the present exemplary embodiment, any of the viewing angle evaluation images according to the first to third exemplary embodiments may be used.

FIG. 15A illustrates a case where two viewing points Vp1 and Vp2 are shown and the evaluation result of the viewing angle evaluation image at the viewing point Vp1 (viewing angle θh1) is poor and the evaluation result of the viewing angle evaluation image at the viewing point Vp2 (viewing angle θh2) is good.

Here, the value of the viewing angle θh2 is determined, for example, by calculating θh2 satisfying tan(θh2)=L2/L1 assuming that the distance from the marker to the viewing point Vp2 is L1 and the distance between the viewing angle evaluation image and the marker is L2. Here, the distance L2 is calculated by converting the number of pixels of the display screen 110 included in the distance L2.

Then, a marker is also displayed on the opposite side of the display screen 110 for the viewing angle evaluation image (for example, a position symmetrical with respect to the viewing angle evaluation image position), and a viewing angle θh2' at which the evaluation result of the viewing angle evaluation image is good is determined by the same procedure as described above.

Then, a range defined by the angle θh2+θh2' is determined as the suitable viewing region.

In addition, both θh2 and θh2' do not necessarily need to be calculated as the viewing angle suitable for viewing unlike in the above explanation, and only one of θh2 and θh2' may be used depending on the purpose of evaluation or the like.

In addition, the above-described display evaluation process may be performed multiple times by changing the height (distance in a direction perpendicular to the plane of the diagram) with respect to the display device 80 according to the size of the display device 80 or the like, and the suitable viewing region may be determined in consideration of the difference in the viewing angle due to the difference in the height with respect to the display device 80. In this case, the positions of the viewing angle evaluation image and the marker on the display screen 110 may be changed according to the height with respect to the display device 80.

Figure 15B:
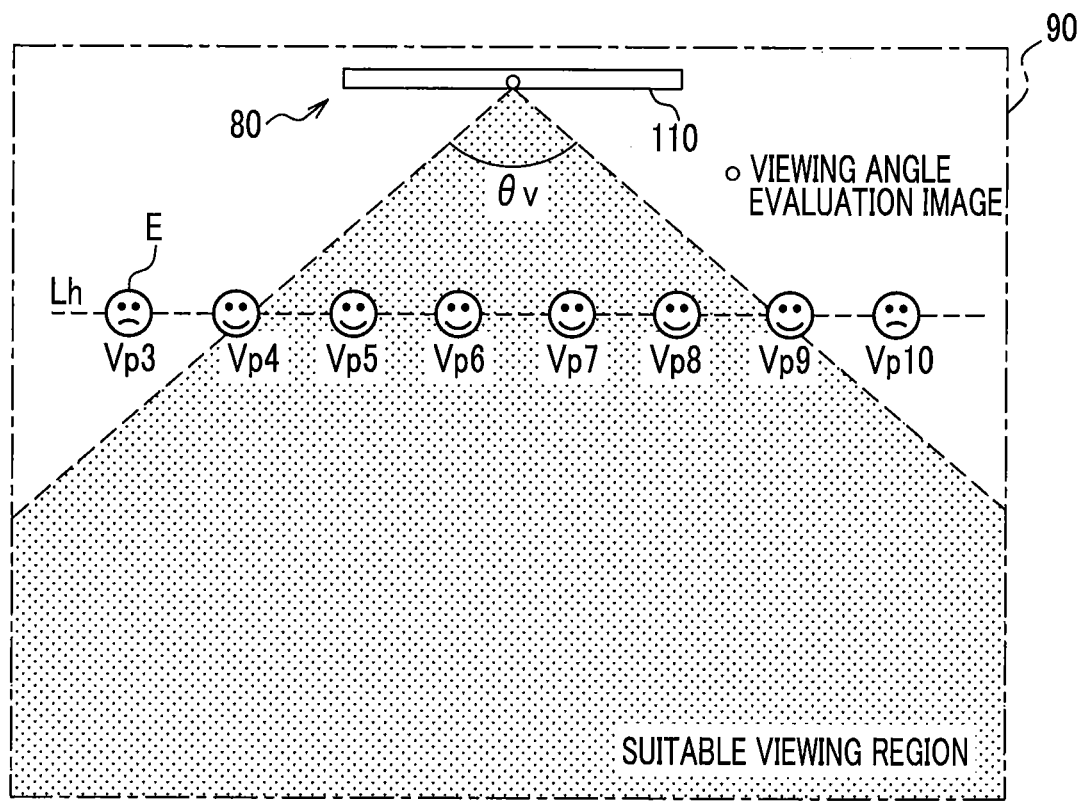

FIG. 15B is a diagram illustrating another example in the determination of the suitable viewing region. In FIG. 15B, the display device 80 is provided in a living room 90 having a certain size. A parallel line Lh in FIG. 15B is a line parallel to the surface of the display screen 110.

In the display evaluation device according to the present exemplary embodiment, first, a viewing angle evaluation image (indicated by O in FIG. 15B) is displayed on the display screen 110 of the display device 80. As a viewing angle evaluation image according to the present exemplary embodiment, any of the viewing angle evaluation images according to the first to third exemplary embodiments may be used.

Then, the viewer E moves along the parallel line Lh while viewing the viewing angle evaluation image, and sends, through the input device 30 (59), a response regarding the determination result of the viewing angle evaluation image (regarding whether or not the viewing angle evaluation image is identified) at the viewing point of the viewing angle set in advance.

FIG. 15B illustrates a case where eight viewing points Vp3 to Vp10 are shown on the parallel line Lh and the evaluation result of the viewing angle evaluation image at the viewing points Vp4 to Vp9 is good and the evaluation result of the viewing angle evaluation image at the viewing points Vp3 and Vp10 is poor.

In this case, the viewing angle suitable for viewing is calculated as an angle θv between the straight line connecting the viewing angle evaluation image and Vp4 and the straight line connecting the viewing angle evaluation image and Vp9. Therefore, the suitable viewing region in the living room 90 in this case is a region (region colored in gray) surrounded by the dashed line illustrated in FIG. 15B.

Next, the display evaluation process performed by the display evaluation device 60 according to the present exemplary embodiment will be described with reference to FIGS. 15B and 16. FIG. 16 is a flowchart illustrating the process flow of a display evaluation program executed by the arithmetic unit (51) of the information processing apparatus 10 (50) according to the present exemplary embodiment.

Since steps S200 to S206 illustrated in FIG. 16 are the same process as steps S100 to S106 illustrated in FIG. 14, explanation thereof will be omitted.

Then, in step S208, the generated viewing angle evaluation image is displayed on the display screen 100. This process is a process that is mainly performed in the viewing angle evaluation image generation unit 63 and the display device 20 (57) illustrated in FIG. 2.

Then, in step S210, the viewer who views the viewing angle evaluation image from the initial viewing point Vp3 sends a response regarding identification through the input device 30 (59), thereby acquiring a result of identification of the viewing angle evaluation image when viewed from the viewing point Vp3. This process is a process that is mainly performed in the viewing angle evaluation unit 64 illustrated in FIG. 2.

Then, in step S212, it is determined whether or not the response regarding the identification of the viewing angle evaluation image has been acquired for all of the viewing points Vp3 to Vp10. When the determination result is negative, the process returns to step S210 to move to the next viewing point and continue the acquisition of the response regarding the identification of the viewing angle evaluation image.

Then, in step S214, the display characteristics of the display device 20 (57) are evaluated based on the response regarding the identification of the viewing angle evaluation image from each viewing point acquired in step S212. In this case, determination as a good viewing angle is made for the viewing point Vp (Vp4 to Vp9) corresponding to the response that the viewing angle evaluation image is not identified, and determination as a poor viewing angle is made for the viewing point Vp (Vp3 and Vp10) corresponding to the response that the viewing angle evaluation image may be identified. This process is a process that is mainly performed in the viewing angle evaluation unit 64 illustrated in FIG. 2.

Fifth Exemplary Embodiment

A display evaluation device according to the present exemplary embodiment will be described with reference to FIG. 15A. The present exemplary embodiment is a display evaluation device that evaluates the precision of the color of the viewing angle when viewed from the viewing point of the specific viewing angle using the evaluation results of the display evaluation devices according to the first to third exemplary embodiments. In the present exemplary embodiment, the specific viewing angle is set to Vp2 which is illustrated in FIG. 15A.

In the display evaluation device according to the present exemplary embodiment, a viewing angle evaluation image to be used in this display evaluation process is determined first. As a viewing angle evaluation image according to the present exemplary embodiment, any of the viewing angle evaluation images according to the first to third exemplary embodiments may be used. The viewing angle evaluation image according to the present exemplary embodiment is determined in advance according to the flowchart illustrated in FIG. 14. Here, as an example, the reference color is set to R(255, 0, 0), and the evaluation color of the viewing angle evaluation image is set to RY(255, α, 0) (α is a fixed value of 0<α<255) in a direction toward Y from R.

In addition, the viewing angle evaluation image generation unit 63 generates a set of (2M+1) viewing angle evaluation images, that is, RY(255, α−M·Δα, 0), RY(255, α−(M−1)·Δα, 0), RY(255, α, 0), RY(255, α+(M−1)·Δα, 0), and RY(255, α+M·Δα, 0), by changing the value of a for RY(255, α, 0) by a variation i·Δα (i=0 to M) with a as the center.

Then, the viewer E views each viewing angle evaluation image of the set of viewing angle evaluation images displayed on the display screen 110 of the display device 80 from the viewing point Vp2, and sends a response regarding the evaluation result of the identification of each viewing angle evaluation image through the input device 30 (59).

In the display evaluation device according to the present exemplary embodiment, by setting Δα to a small value, more precise color evaluation for the display device 80 is performed from the identification result replied for each viewing angle evaluation image of the set of viewing angle evaluation images. Therefore, the display evaluation device according to the present exemplary embodiment may be applied to a display device of an information processing apparatus for which precise color reproducibility is required, for example.

According to the display evaluation device according to the present exemplary embodiment, the precision of the viewing angle may also be evaluated by using the same method as the display evaluation process for the precision of the color described above.

A display evaluation device according to the present exemplary embodiment will be described with reference to FIG. 15A. The present exemplary embodiment is a display evaluation device that evaluates the precision of the viewing angle when viewed from the viewing point of the specific viewing angle using the results of the display evaluation devices according to the first to third exemplary embodiments. In the present exemplary embodiment, the specific viewing angle is set to Vp2 which is illustrated in FIG. 15A.

In the display evaluation device according to the present exemplary embodiment, a viewing angle evaluation image of the color set in advance to be used in this display evaluation process is determined first. As a viewing angle evaluation image according to the present exemplary embodiment, any of the viewing angle evaluation images according to the first to third exemplary embodiments may be used. The viewing angle evaluation image according to the present exemplary embodiment is determined in advance according to the flowchart illustrated in FIG. 14.

Then, a set of different (2M+1) viewing angles, that is, (θh2−M·Δθ), (θh2−(M−1)·Δθ), . . . , θh2, . . . , (θh2+(M−1)·Δθ), and (θh2+M·Δθ) are set with the viewing angle θh2 as the center.

Then, the viewer E views a viewing angle evaluation image displayed on the display screen 110 of the display device 80 from each viewing point of the set of viewing angles, and sends a response regarding the evaluation result of the identification of the viewing angle evaluation image from each viewing point through the input device 30 (59).

In the display evaluation device according to the present exemplary embodiment, by setting Δθ to a small value, more precise viewing angle evaluation for the set of (2M+1) viewing angles is performed from the identification result of the viewing angle evaluation image when viewed from the viewing point of each viewing angle.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display evaluation device, comprising:
   a processor configured to act as:
   a second output unit that generates a gradation evaluation image having a plurality of gradation values and that outputs the gradation evaluation image for display on a display device;
   a receiving unit that receives a response regarding an appearance of the gradation evaluation image when the gradation evaluation image is viewed from a predetermined reference viewing angle of the display device;
   a specification unit that specifies a boundary gradation value as a boundary of whether or not a viewer identifies a color of an image displayed on the display device from the predetermined reference viewing angle based on the response regarding an appearance of the gradation evaluation image received by the receiving unit;
   a first output unit that generates a viewing angle evaluation image using a boundary image having a gradation value close to the specified boundary gradation value and that outputs the viewing angle evaluation image for display on the display device;
   the receiving unit receiving a response regarding an appearance of the viewing angle evaluation image when the viewing angle evaluation image is viewed from a plurality of viewing angles different from the predetermined reference viewing angle; and
   an evaluation unit that specifies presence or absence of a difference in appearance of the viewing angle evaluation image when the viewing angle evaluation image is viewed from the plurality of viewing angles based on the response regarding an appearance of the viewing angle evaluation image received by the receiving unit and that evaluates the display characteristics of the display device due to a viewing angle difference.

2. The display evaluation device according to claim 1, wherein the first output unit generates an image, the image being more difficult to identify than the boundary image, as the viewing angle evaluation image.

3. The display evaluation device according to claim 1, wherein the second output unit arranges the plurality of images in an order in which the image is difficult to be identified or in an order in which the image is easy to be identified, and outputs the plurality of arranged images as the viewing angle evaluation image for display on the display device.

4. The display evaluation device according to claim 2,
wherein the second output unit arranges the plurality of images in an order in which the image is difficult to be identified or in an order in which the image is easy to be identified, and outputs the plurality of arranged images as the viewing angle evaluation image for display on the display device.

5. The display evaluation device according to claim 1,
wherein the second output unit arranges the plurality of images, as the viewing angle evaluation image, to the display device for display in a central portion of the display device.

6. The display evaluation device according to claim 1,
wherein the second output unit generates the gradation evaluation image by combining a plurality of unit gradation images obtained by changing relative gradation values of an image including two regions having different relative gradation values of a color set in advance, and outputs the gradation evaluation image for display on the display device,
the first output unit generates the unit gradation image of a gradation value, which is selected based on the gradation value of the boundary image, as the viewing angle evaluation image, and
the evaluation unit determines the unit gradation image of a gradation value close to the specified boundary gradation value as the boundary image.

7. The display evaluation device according to claim 6,
wherein the evaluation unit determines a unit gradation image having the relative gradation value that is most difficult to identify, among the unit gradation images having identifiable relative gradation values, as the boundary image, and
the first output unit generates a unit gradation image, of which the relative gradation value is more difficult to identify than the relative gradation value of the boundary image, as the viewing angle evaluation image.

8. The display evaluation device according to claim 6,
wherein the second output unit arranges the plurality of unit gradation images in order in which the relative gradation value is difficult to be identified or in order in which the relative gradation value is easy to be identified, and outputs the plurality of arranged unit gradation images for display on the display device.

9. The display evaluation device according to claim 7,
wherein the second output unit arranges the plurality of unit gradation images in order in which the relative gradation value is difficult to be identified or in order in which the relative gradation value is easy to be identified, and outputs the plurality of arranged unit gradation images for display on the display device.

10. The display evaluation device according to claim 6,
wherein the second output unit outputs the plurality of unit gradation images to the display device to be displayed in a central portion of the display device.

11. The display evaluation device according to claim 6,
wherein the second output unit generates the plurality of unit gradation images with different relative gradation values by changing a gradation value of a second region of each of the unit gradation images including a first region of a fixed gradation value and the second region which is disposed inside the first region and has a variable gradation value, and outputs the plurality of unit gradation images for display on the display device.

12. The display evaluation device according to claim 6,
wherein the second output unit generates the plurality of unit gradation images with the different relative gradation values by changing a gradation value of a character or a figure of each unit gradation image including a first region of a fixed gradation value and a second region that is disposed inside the first region and is expressed by the character or the figure having a variable gradation value, arranges the plurality of unit gradation images in an order set in advance, and outputs the plurality of unit gradation images for display on the display device.

13. The display evaluation device according to claim 6,
wherein the second output unit generates the plurality of unit gradation images with different relative gradation values by changing a gradation value of a second region of each unit gradation image including a first region of a fixed gradation value and the second region that is disposed side by side with the first region and has a variable gradation value, arranges the plurality of unit gradation images in an order set in advance, and outputs the plurality of unit gradation images for display on the display device.

14. The display evaluation device according to claim 11,
wherein the second output unit generates the plurality of unit gradation images with the different relative gradation values by setting a coordinate component in an RGB color space of the second region by performing addition or subtraction for a smallest coordinate component of coordinate components in an RGB color space of the first region.

15. The display evaluation device according to claim 11,
wherein the second output unit generates the plurality of unit gradation images with the different relative gradation values by setting a coordinate component in an RGB color space of the second region by performing addition or subtraction for at least one of coordinate components in an RGB color space of the first region and by setting each coordinate component in the RGB color space of the second region to have a value of ½ or less of a maximum value of a coordinate component in the RGB color space.

16. The display evaluation device according to claim 6,
wherein a gradation value of the color set in advance is a gradation value obtained by setting at least one of coordinate components in an RGB color space to 0 or a value within a predetermined range from 0.

17. The display evaluation device according to claim 1,
wherein the receiving unit receives a first response sent when the viewing angle evaluation image is viewed from a plurality of different viewing angles on a straight line perpendicular to a screen of the display device or from a plurality of different viewing angles on a straight line parallel to the screen of the display device, and
wherein the evaluation unit specifies presence or absence of a difference in appearance of the viewing angle evaluation image when the viewing angle evaluation image is viewed from the plurality of viewing angles based on the first response, and evaluates a region suitable for viewing of the display device.

18. The display evaluation device according to claim 17,
wherein the second output unit generates a plurality of unit gradation images by changing relative gradation values of an image including two regions having different relative gradation values of a color set in advance and outputs the plurality of unit gradation images for display on the display device, wherein the receiving unit further receives a second response sent when the plurality of unit gradation images are viewed from a predetermined viewing angle of the display device, the evaluation unit specifies the boundary image based on the second response, and the first output unit generates the viewing angle evaluation image based on a gradation value of the specified boundary image.

19. A display evaluation method, comprising:

generating a gradation evaluation image having a plurality of gradation values and outputting the gradation evaluation image for display on a display device;

receiving a response regarding an appearance of the gradation evaluation image when the gradation evaluation image is viewed from a predetermined reference viewing angle of the display device;

specifying a boundary gradation value as a boundary of whether or not a viewer identifies a color of an image displayed on the display device based on the response received regarding an appearance of the gradation evaluation image;

generating a viewing angle evaluation image using a boundary image having a gradation value close to the specified boundary gradation value, and outputting the viewing angle evaluation image for display on the display device;

receiving a response regarding an appearance of the viewing angle evaluation image when the viewing angle evaluation image is viewed from a plurality of viewing angles different from the predetermined reference viewing angle; and specifying presence or absence of a difference in appearance of the viewing angle evaluation image when the viewing angle evaluation image is viewed from the plurality of viewing angles based on the received response regarding an appearance of the viewing angle evaluation image, and evaluating the display characteristics of the display device due to a viewing angle difference.

20. A non-transitory computer readable medium storing a program causing a computer to execute a process for display evaluation, the process comprising:

generating a gradation evaluation image having a plurality of gradation values and outputting the gradation evaluation image for display on a display device;

receiving a response regarding an appearance of the gradation evaluation image when the gradation evaluation image is viewed from a predetermined reference viewing angle of the display device;

specifying a boundary gradation value as a boundary of whether or not a viewer identifies a color of an image displayed on the display device based on the response received regarding an appearance of the gradation evaluation image;

generating a viewing angle evaluation image using a boundary image having a gradation value close to the specified boundary gradation value, and outputting the viewing angle evaluation image for display on the display device;

receiving a response regarding an appearance of the viewing angle evaluation image when the viewing angle evaluation image is viewed from a plurality of viewing angles different from the predetermined reference viewing angle; and specifying presence or absence of a difference in appearance of the viewing angle evaluation image when the viewing angle evaluation image is viewed from the plurality of viewing angles based on the received response regarding an appearance of the viewing angle evaluation image, and evaluating the display characteristics of the display device due to a viewing angle difference.

\* \* \* \* \*